United States Patent
Hamamoto et al.

(10) Patent No.: US 6,947,236 B2
(45) Date of Patent: Sep. 20, 2005

(54) MAGNETIC SIGNAL RECORDING METHOD AND MAGNETIC RECORDING-REPRODUCTION APPARATUS

(75) Inventors: Masaki Hamamoto, Sakurai (JP); Hiroyuki Katayama, Nara (JP); Kunio Kojima, Nabari (JP); Junichi Sato, Nara (JP); Kazuhisa Takayama, Tenri (JP); Kosuke Watanabe, Yao (JP)

(73) Assignee: Sharp Kabushiki Kaisha, Osaka (JP)

(*) Notice: Subject to any disclaimer, the term of this patent is extended or adjusted under 35 U.S.C. 154(b) by 427 days.

(21) Appl. No.: 09/925,907

(22) Filed: Aug. 9, 2001

(65) Prior Publication Data

US 2002/0018312 A1 Feb. 14, 2002

(30) Foreign Application Priority Data

Aug. 11, 2000 (JP) ........................... 2000-245153

(51) Int. Cl.[7] .............................................. G11B 5/02
(52) U.S. Cl. .......................................................... 360/59
(58) Field of Search ........................ 360/59, 17; 369/13, 369/13.54, 13.46, 13.51, 13.06, 13.08, 13.09, 13.14

(56) References Cited

U.S. PATENT DOCUMENTS

| | | | |
|---|---|---|---|
| 5,371,721 A | * 12/1994 | Greidanus et al. | 369/13.14 |
| 5,656,385 A | 8/1997 | Nakajima et al. | 428/694 |
| 5,666,332 A | * 9/1997 | Nakayama et al. | 360/59 |
| 5,706,259 A | * 1/1998 | Fukamachi et al. | 360/59 |
| 5,757,736 A | * 5/1998 | Onagi | 369/13.54 |
| 5,883,863 A | * 3/1999 | Itakura et al. | 369/13.05 |
| 6,143,436 A | 11/2000 | Nakajima et al. | 428/694 |
| 6,347,016 B1 | * 2/2002 | Ishida et al. | 360/17 |
| 6,611,388 B1 | * 8/2003 | Miyata et al. | 360/17 |

FOREIGN PATENT DOCUMENTS

WO  WO 92/02931  2/1992

* cited by examiner

Primary Examiner—David Hudspeth
Assistant Examiner—Glenda P. Rodriguez
(74) Attorney, Agent, or Firm—David G. Conlin; William J. Daley, Jr.; Edwards & Angell, LLP

(57) ABSTRACT

A magnetic signal recording method of the present invention superimposes a recording edge of a recordable region on a region where there is substantial equality between (a) a coercive force in a region on a magnetic recording medium in which the coercive force has been varied, and (b) magnetic field intensity, which is generated by a magnetic recording head. The magnetic field intensity has a magnetic field distribution whose lowering rate in an in-track position is maximum in the region. The magnetic recording head, whose recording magnetic field is distributed in a rectangular shape, is used in this way so as to form a magnetic bit having a rectangular shape that is suitable for reproduction performed by a common reproduction head having a rectangular reproduction region, thereby improving an S/N of a reproduction signal dramatically.

18 Claims, 20 Drawing Sheets

MOVING DIRECTION OF MAGNETIC RECORDING MEDIUM

MOVING DIRECTION OF
MAGNETIC RECORDING
MEDIUM

FIG. 5 (a)
MOVING DIRECTION OF MAGNETIC RECORDING MEDIUM →
FIG. 5 (b)
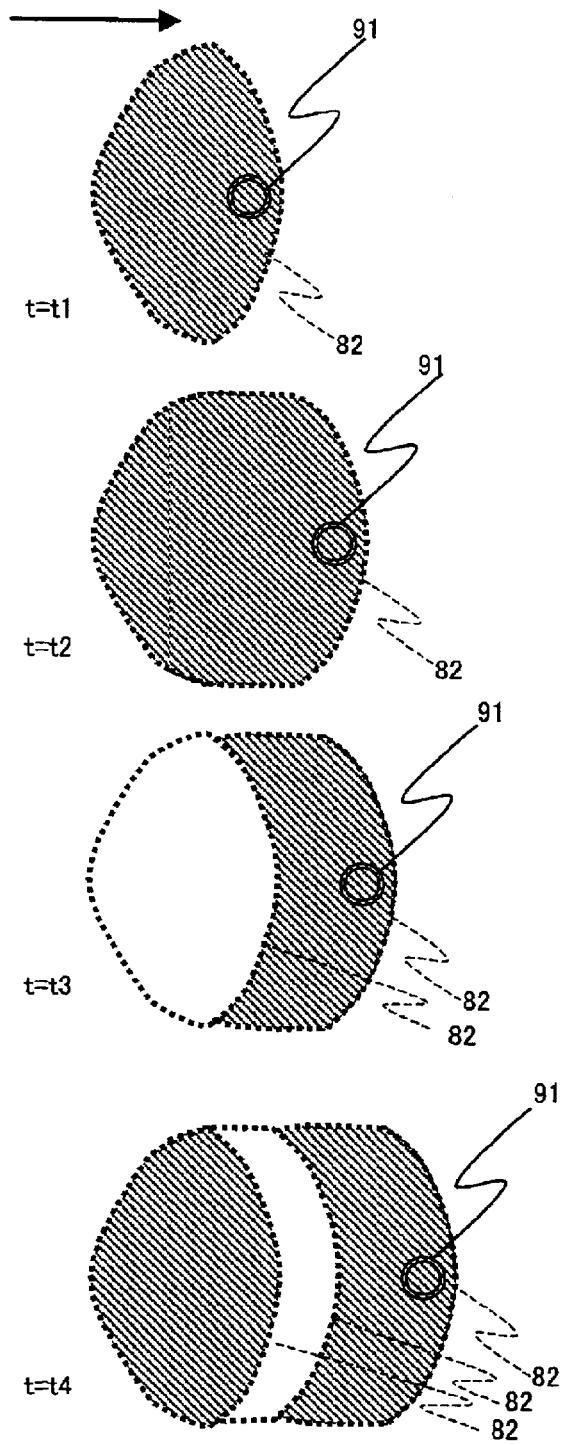
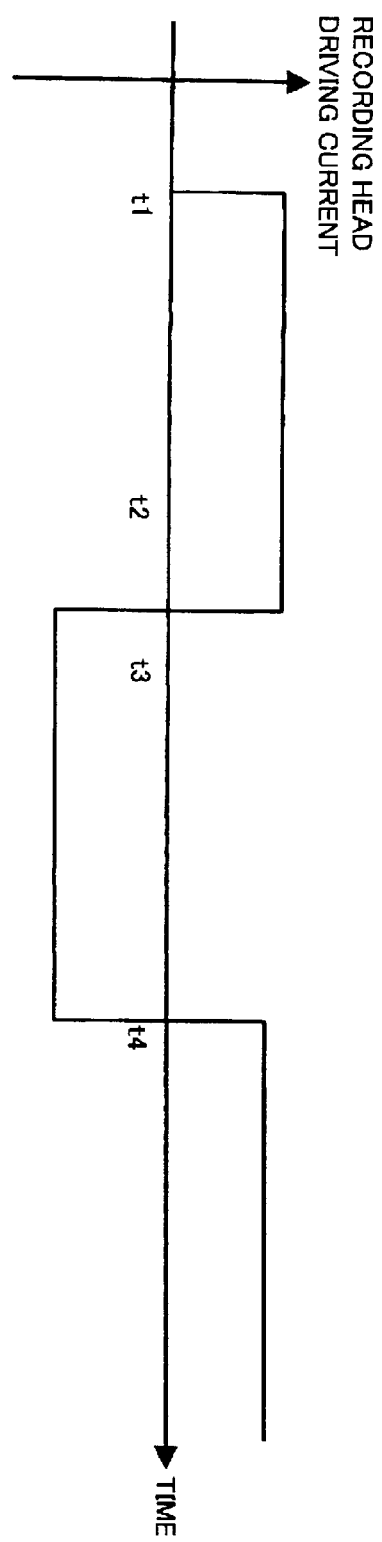

MOVING DIRECTION OF MAGNETIC RECORDING MEDIUM → t=t1 — VIRTUAL MARK t=t2 — VIRTUAL MARK t=t3 — VIRTUAL MARK t=t4 — VIRTUAL MARK, MAGNETIC BIT

RECORDING HEAD DRIVING CURRENT → TIME (t1, t2, t3, t4)

PRIOR ART

MAGNETIC SIGNAL RECORDING METHOD AND MAGNETIC RECORDING-REPRODUCTION APPARATUS

FIELD OF THE INVENTION

The present invention relates to a magnetic signal recording method that performs magnetic recording while heating up a recording medium so that high-density recording is realized, especially to a magnetic signal recording method that records a bit having a shape suitable for reproduction and a magnetic signal recording-reproduction apparatus using same.

BACKGROUND OF THE INVENTION

Recent improvement in multimedia technology has increased an amount of information to deal with, thereby demanding a memory device having a large capacity. It has been intensively studied how to improve a density in memory devices, especially a rewritable optical disc, a magnetic disc and a magnetic tape.

As one of such technologies how to improve the density of the memories, suggested is a recording-reproduction method that uses a magnetic recording medium having magnetic characteristics varied according to temperature, and locally heats up a portion of the magnetic recording medium, for example, by means of projection of light onto the portion (the portion locally heated is referred to as a heated area, hereinafter), and performs magnetic recording or reproduction of the heated area exclusively, thereby realizing recording and reproduction of a high density.

A method, which performs magnetic recording or reproduction of information in the locally-heated area of such a magnetic recording medium, is called a heat-assisting magnetic signal recording method or a heat-assisting magnetic signal reproduction method (a heat-assisting magnetic signal recording-reproduction method), for example. Especially, in case optical means is used for locally heating up the heated area, such a method is denoted as a light-assisting magnetic signal recording method or a light-assisting magnetic signal reproduction method (a light-assisting magnetic signal recording-reproduction method).

As examples of the heat-assisting magnetic signal recording-reproduction method, suggested are a variety of such methods in which (a) used as a recording medium is a vertical magnetic film made of a ferrimagnetic material having a magnetic compensation point temperature (that is, a temperature at which magnetization is zero) in a vicinity of room temperature, (b) during recording, a light beam is projected onto an area for recording in the recording medium so as to heat up the area for recording to a vicinity of Curie temperature, then an external magnetic field is applied into the area for recording by using a recording head so as to record information, (c) during reproduction, the light beam is projected onto an area for reproduction in the recording medium so as to heat up the area for reproduction in order to facilitate magnetization in the area for reproduction, then a magnetic flux leaked out of the area for reproduction is detected by a reproduction head so as to reproduce the information.

By the way, in the heat-assisting magnetic recording method, a shape of a magnetic bit depends on a temperature distribution and a magnetic field distribution.

For example, a converging laser beam, which is common means for locally heating up the heated area, produces a heat distribution in a circle or substantially ellipsoidal shape on the recording medium. Meanwhile, a ring head, which is commonly used as a recording magnetic head at present, makes a magnetic field distribution in a substantially rectangular shape. For this reason, the magnetic bit recorded has a shape which is resulted from a combination of both of the shapes.

However, a reproduction head, which is commonly used at present, has a substantially rectangular shape, thus its reproduction region is in the substantially rectangular shape. Therefore, the creation of the magnetic bit in a non-rectangular shape as described above causes such a problem that an S/N of a signal is adversely affected, thereby giving a drawback to achieve the recording-reproduction process having high bit density.

According to "published Japanese translation of PCT international publication for patent applications (Tokuhyohei) No. 6-500194 (published on Jan. 6, 1994) (hereinafter, referred to as the Reference 1), in which discussed is how to decide the shape of the magnetic bit in the heat-assisting magnetic recording method, the following conditions are effective to record a magnetic bit in a substantially rectangular shape:

(1) a coercive force of the magnetic recording medium is substantially constant along a direction of tracks, (2) contour lines of the coercive force (hereinafter, just referred to as coercive force contour lines) of the magnetic recording medium are substantially parallel to the direction of the track, (3) in order to attain the conditions (1) and (2), created on the magnetic recording medium is a temperature distribution having a shape long in the direction of the track.

(4) to attain the condition (3), used as the heating means is the converged laser beam that has a focal image in an oblong shape, (5) to attain the condition (3), used is a magnetic recording medium having thermal anisotropy in the direction of the track, and (6) the coercive force of the medium is constant in a vicinity of a recording temperature, regardless of the temperature.

However, the Reference 1 fails to take the magnetic field distribution of the magnetic recording head into consideration. The inventors of the present invention have found out that (a) the technology disclosed in the cited Reference 1 is not able to record a magnetic bit having a rectangular shape, which cannot be produced in the technology, and (b) the technology disclosed in the Reference is not suitable for the high bit density recording because the magnetic field distribution of the magnetic recording head is not taken into consideration, as specifically explained below.

As discussed above, the shape of the magnetic bit is determined by a change in the magnetic characteristics of the magnetic recording medium due to temperature, the temperature distribution formed on the magnetic recording medium, and the magnetic field applied onto the magnetic recording medium.

Here, it is assumed that the magnetic recording medium is a uniaxial magnetic anisotropic medium having an axis of easy magnetization (easy axis) along a vertical direction with respect to a surface of the magnetic recording medium. Because, in the magnetic recording medium, only a component, which is vertical to the surface of the magnetic recording medium, of the magnetic field contributes the recording in the magnetic recording medium. Therefore, the component of the magnetic field will be called as a vertical magnetic field intensity or a recording magnetic field intensity, hereinafter.

Note that, since only the component of the magnetic field vertical to the surface of the magnetic recording medium (film surface), a coercive force applied onto the magnetic field in the vertical direction to the surface of the magnetic recording medium is denoted as a coercive force of the magnetic recording medium, hereinafter.

In FIG. 17, shown is a relationship between the coercive force, which is applied on to the magnetic field in the vertical direction to the film surface, and the temperature in the magnetic recording medium.

Furthermore, it is assumed that the temperature distribution formed on the magnetic recording medium is in an oblong shape, as recited in the Reference 1, for convenience to explain.

Another assumption is the vertical magnetic field intensity applied onto the magnetic recording medium is constant in a direction of a track pitch, for convenience to explain. Thus, contour lines of the vertical magnetic field intensity (hereinafter, just referred to as magnetic field intensity contour lines) are lines vertical with respect to the direction of the track pitch.

FIG. 12 is a graph explaining how the vertical magnetic field intensity is distributed on the magnetic recording medium by a common ring head.

The above assumptions and the conditions give a temperature distribution and a magnetic field distribution, which are recommended in the Reference 1 so as to attain the magnetic bit having the rectangular shape. The temperature distribution and the magnetic field distribution are indicated by coercive force contour lines 701 and magnetic field intensity contour lines 601 in FIG. 18. Note that, in FIG. 18, illustrated is a positional relationship between the coercive force contour lines 701 and the magnetic field contour lines 601 on the magnetic recording medium, based on the technology disclosed in Reference 1.

Here, the heat-assisting magnetic recording is carried out in a region in which the coercive force of the magnetic recording medium falls below a recording magnetic field intensity. The region is highlighted by using crosshatching in FIG. 18, and is called as a recordable region 800. Note that, only a trailing edge of the recordable region 800 concerns to the determination of the shape of the magnetic bit. This will be explained later. Therefore, hereinafter, an explanation on a part of the recordable region, which does not contribute to the determination of the shape of the magnetic bit, will be omitted.

The magnetic bit is formed by magnetizing the magnetic recording medium in different directions in the vertical direction with respect to the film surface, while moving the magnetic recording medium. The formation of the magnetic bit is illustrated in FIGS. 19(*a*) and 19(*b*). A virtual mark 901 in FIGS. 19(*a*) and 19(*b*) is a virtual (imaginary) point fixed on the magnetic recording medium in order to assist the understanding of movement of the magnetic recording medium. It is explicit here that the magnetic bit recorded in such a shape that its edges in the track direction is shaped by a shape of the trailing edge of the recordable region in the track direction.

In short, the shape of the trailing edge of the recordable region 800 determines the shape of the edges of the magnetic bit in the track direction. Hereinafter, the trailing edge of the recordable is called a recording edge 801.

As described above, the shape of the magnetic bit is dependant on the shape of a recording edge that is determined according to the coercive force distribution in the direction vertical to the track and the magnetic field intensity in the track direction. Thus, in order to record the magnetic bit in the rectangular shape, it is preferable that the recording edge has a shape approximate to a linear shape that is vertical with respect to the track direction.

Therefore, similar to the case where the technology of the Reference 1 is employed, even though the temperature distribution having the oblong shape is assumed, the recording edge is a curve, thereby giving the magnetic bit a curved section having a width in correspondence with the magnetic field distribution.

Therefore, it is impossible to form the magnetic bit having the substantially rectangular shape by using the temperature distribution having the oblong shape recited in the Reference 1.

Moreover, a common magnetic recording-reproduction apparatus uses a magnetic recording medium having a disc shape, so that various different addresses can be easily accessed. Thus, the common magnetic recording-reproduction apparatus is provided with means for revolving the magnetic recording medium having the disc shape, and means for moving a recording-reproduction head in a substantially radial direction of the disc-shaped magnetic recording medium.

In many cases, because the means for moving the recording-reproduction head is rotated, the recording-reproduction head makes a difference angle with a moving direction of the magnetic recording medium, depending on where the recording-reproduction head has an access position. In other words, the access position of the recording-reproduction head changes an angle between the magnetic field distribution and the temperature distribution, thereby changing the shape of the recording edge. FIG. 20 illustrates how the shape of the recording edge is changed. The change is more enlarged as the temperature distribution to apply is longer in the track direction. Thus, it is proved that the temperature distribution having the oblong shape recited in the Reference 1 is not adequate to be used in the high density recording.

In addition, the formation of the temperature distribution having the oblong shape heats up a large area of the magnetic recording medium, thereby having such a disadvantage that a large amount of electric power is consumed.

Furthermore, the use of the recording-reproduction head having the temperature distribution having the oblong shape maintains a temperature of the magnetic bit at a vicinity of a recording temperature for a significant period of time after the recording-reproduction head having the temperature distribution passes through a recording region. Thus, the magnetic bit may become instable due to this. Further, the magnetic field is disturbed, for example, by another magnetic field of another magnetic bit, thereby partially changing a position of the recording edge 801. As a result, the shape of the magnetic bit recorded may be altered in a long area. This means that the shape of the magnetic bit recorded may not be constant even if a short magnetic bit is recorded for a sake of high density recording.

Moreover, while it is preferable that the magnetic bit is ended by reduction of the coercive force in accordance with the temperature distribution so as to make the best of a high track density of the optical recording. However, the statement that the coercive force is constant in the vicinity of the recording temperature is not enough to explain the feature. That is, in the medium recited in the Reference 1, the track pitch is determined mainly by a width of a recording gap.

Therefore, in the conventional light-assisting magnetic recording method, with the method recited in the Reference 1, the magnetic bit having the rectangular shape can be recorded in a substantially constant shape only if the magnetic bit has a longer length than the gap of the magnetic recording head. Thus, the method of the Reference 1 is inadequate for the high density recording and reproduction, in terms of the S/N.

Moreover, in a case where the common disc drive is used to realize the method recited in the Reference 1, it is necessary to employ a signal processing method in accordance with the magnetic bit that is varied according to an access position of the magnetic recording head.

Furthermore, in the method of the Reference 1, extra power is required for a laser used for the recording. Moreover, the magnetic bit recorded is very instable against heat.

Moreover, in case where the magnetic recording medium recited in the Reference 1 is used in the common disc drive, the track pitch is determined by the width of the gap of the magnetic recording head, so that it is impossible to make the best of the high track density of the optical recording.

SUMMARY OF THE INVENTION

The present invention has objects (a) to solve the foregoing problems in the conventional heat-assisting magnetic signal reproduction method, (b) to provide a magnetic signal recording method in which a magnetic bit having a shape that is most suitable for reproduction is formed in a substantially constant shape in a view of a magnetic field distribution of a magnetic recording head, so as to significantly improve an S/N of a reproduction signal, and (c) to provide a magnetic recording-reproduction apparatus using same method at a low cost with no difficulty.

Since a shape of a recordable region on a magnetic recording medium attains a better approximation to a shape of contour lines of a magnetic field distribution for recording (that is a magnetic field having a component vertical with respect to a film surface, in case of use of a vertical recording medium) in a vicinity of the recordable region as the magnetic field distribution for recording is lowered sharper, inventors of the present invention have found out that, attained is a good approximation of a shape of an edge of the recordable region to a shape of the contour lines of the recording magnetic field distribution, by locating the edge of the recordable region at a position that gives a largest lowering rate/a maximum lowering of recording magnetic field intensity. Furthermore, the inventors of the present inventions found out that the contour lines of the recording magnetic field distribution attains a rectangular shape by using a magnetic recording head by which the recording magnetic field is distributed in a rectangular shape on the magnetic recording medium, so that the edge of the recordable region is rectangularly shaped so as to record the magnetic bit in the rectangular shape.

In short, a magnetic signal recording method of the present invention, comprising the step of recording arbitrary information in a region on a magnetic recording medium where a coercive force has been varied with local heating, in accordance with a magnetic field from a magnetic recording head, wherein an edge of a recordable region on the magnetic recording medium is located in a position in which substantial equality is attained between (a) a coercive force in the region where the coercive force on the magnetic recording medium has been varied, and (b) magnetic field intensity in an in-track position (a position in the track direction) in which a magnetic field distribution generated by the magnetic recording head is lowered at a maximum/greatest rate.

Therefore, it is possible to attain the good approximation of the shape of the edge of the recordable region to the shape of the contour lines of the recording magnetic field distribution, when the edge of the recordable region is located in such a position that gives substantial equality between (a) the coercive force in a region in which the coercive force of the magnetic recording medium has been changed, and (b) the magnetic field intensity in which the magnetic field distribution formed by the magnetic recording head has a largest lowering rate/is lowered at a maximum in an in-track direction position.

The use of the magnetic recording head having the rectangular-shaped recording magnetic field that is applied on the magnetic recording medium can give the rectangular shape to the contour lines of the recording magnetic field distribution, so that the edge of the recordable region is rectangularly shaped, so as to record the magnetic bit in a rectangular shape.

This significantly improves the S/N of a reproduction signal in a magnetic recording medium that has been subjected to high-density recording (in which the magnetic bit is recorded in a high density), in case where reproduced is a magnetic field leaked out of a substantially rectangular-shaped magnetic bit formed on the magnetic recording medium by a reproduction head having a reproduction region in a rectangular shape.

Another magnetic signal recording method of the present invention, comprising the step of recording arbitrary information in a region on a magnetic recording medium where a coercive force has been varied with local heating, in which a single-magnetic polar head is used as a magnetic recording head, the magnetic recording medium having an axis of easy magnetization vertical to a film surface of the magnetic recording medium, and the single-magnetic polar head generating a magnetic field having a component vertical to the film surface, while having a main magnetic pole wider than a track pitch, wherein an edge of a recordable region on the magnetic recording medium is located in a position where substantial equality is attained between (a) a coercive force in the region where the coercive force on the magnetic recording medium has been varied, and (b) a component of magnetic field intensity of the single-magnetic polar head in a position in which the component is lowered at a maximum/greatest rate in a trailing edge of the main magnetic pole in the track direction, the component being vertical to the film surface.

Therefore, the approximation of the shape of the edge of the recordable region to the shape of the contour lines of the recording magnetic field distribution by locating the edge of the recordable region in the position that gives the substantial equality between (a) the coercive force in the region in which the coercive force on the magnetic recording medium has been changed, and (b) the component, which is vertical with respect to the film surface of the magnetic recording medium, of the magnetic field intensity of the single-magnetic polar head in the position where the magnetic field intensity is lowered at a maximum/largest rate in the trailing edge of a main magnetic pole in the track direction.

The use of the magnetic recording head having the rectangular-shaped distribution of the magnetic filed applied on the magnetic recording medium can make the contour lines of the recording magnetic field the rectangular shape, so that edge of the recordable region is rectangularly shaped so as to record the magnetic bit in the rectangular shape.

This significantly improves the S/N of a reproduction signal in a magnetic recording medium that has been subjected to high-density recording (in which the magnetic bit is recorded in the high density), in case where reproduced is a magnetic field leaked out of the magnetic bit formed in the substantially rectangular shape on the magnetic recording medium by the reproduction head having the reproduction region in the rectangular shape.

Still another magnetic signal recording method of the present invention, comprising the step of recording arbitrary information in a region on a magnetic recording medium where a coercive force has been varied with local heating, in which a ring head is used as a magnetic recording head, the magnetic recording medium having an axis of easy magnetization vertical to a film surface of the magnetic recording medium, and the ring head generating a magnetic field having a component vertical to the film surface, while having a ring head recording gap width that is wider than a track pitch, wherein an edge of a recordable region on the magnetic recording medium is located in a position in which substantial equality is attained between (a) a coercive force in the region where the coercive force on the magnetic recording medium has been varied, and (b) a component of magnetic field intensity of the ring head in a position in which the component is lowered at a maximum/greatest rate in a vicinity of a position right below a leading edge of the ring head recording gap in the track direction, the component being vertical to the film surface.

Therefore, it is possible to attain the good approximation of the shape of the edge of the recordable region to the shape of the contour lines of the recording magnetic field when the edge of the recordable region is located in the position that gives substantial equality between (a) the coercive force in the region in which the coercive force of the magnetic recording medium is changed, and (b) a component, which is vertical to the film surface, of magnetic field intensity of the ring head in a position in which the component is lowered at a maximum/greatest rate in a vicinity of a position right below a leading edge of the ring head recording gap in the track direction.

The use of the magnetic recording head having the rectangular-shaped distribution of the magnetic field applied on the magnetic recording medium can give the contour lines of the recording magnetic field the rectangular shape, so that edge of the recordable region is rectangularly shaped so as to record the rectangular-shaped magnetic bit.

This significantly improves the S/N of a reproduction signal in a magnetic recording medium that has been subjected to high-density recording (in which the magnetic bit is recorded in a high density), in case where reproduced is a magnetic field leaked out of a substantially rectangular-shaped magnetic bit formed on the magnetic recording medium by a reproduction head having a reproduction region in a rectangular shape.

Yet another magnetic signal recording method of the present invention, comprising the step of recording arbitrary information in a region on the magnetic recording medium where the coercive force has been varied with local heating, in which a ring head is used as a magnetic recording head, the magnetic recording medium having an axis of easy magnetization parallel to a film surface of the magnetic recording medium, and the ring head generating a magnetic field having a component parallel to the film surface, while having a ring head recording gap width that is wider than a track pitch, wherein an edge of a recordable region on the magnetic recording medium is located in a position in which substantial equality is attained between (a) a coercive force in the region where the coercive force on the magnetic recording medium has been varied, and (b) a component of magnetic field intensity of the ring head in a position in which the component is lowered at a maximum/greatest rate in a trailing edge of the ring head recording gap in the track direction, the component being parallel to the film surface.

Therefore, it is possible to attain the good approximation of the shape of the edge of the recordable region to the shape of the contour lines of the recording magnetic field when the edge of the recordable region is located in the position that gives substantial equality between (a) the coercive force in the region in which the coercive force of the magnetic recording medium is changed, and (b) a component, which is vertical to the film surface, of magnetic field intensity of the ring head in a position in which the component is lowered at a maximum/greatest rate in a vicinity of a position right below a leading edge of the ring head recording gap in the track direction.

The use of the magnetic recording head having the rectangular-shaped distribution of the magnetic field applied on the magnetic recording medium can give the contour lines of the recording magnetic field the rectangular shape, so that edge of the recordable region is rectangularly shaped so as to record the rectangular-shaped magnetic bit.

This significantly improves the S/N of a reproduction signal in a magnetic recording medium that has been subjected to high-density recording (in which the magnetic bit is recorded in a high density), in case where reproduced is a magnetic field leaked out of a substantially rectangular-shaped magnetic bit formed on the magnetic recording medium by a reproduction head having a reproduction region in a rectangular shape.

Furthermore, as discussed above, in the region on the recording medium where the coercive force has been varied by the local heating means, at least a part of a region, where the coercive force and the magnetic field intensity of the ring head are equal to each other in terms of an in-plane component of the magnetic recording medium, is positioned right below the trailing edge of the ring head recording gap in the track direction. This makes it possible to perform the recording in a region where the magnetic field intensity, which relates to the information recording, is lowered at the maximum/largest rate.

For a fuller understanding of the nature and advantages of the invention, reference should be made to the ensuing detailed description taken in conjunction with the accompanying drawings.

BRIEF DESCRIPTION OF THE DRAWINGS

FIG. 5(a) is an explanatory view showing steps of forming the magnetic bit on the magnetic recording medium by employing the magnetic signal recording method of the present invention.

FIG. 5(b) is a timing chart of a driving current of a recording head in the steps of forming the magnetic bit shown in FIG. 5(a).

DESCRIPTION OF THE EMBODIMENTS

[First Embodiment]

Described below is an embodiment of the present invention.

It should be noted that, in the present embodiment, explained is a case where (a) used as a recording medium is a magnetic recording medium that includes an alloy thin film, as a magnetic recording layer, that has an axis of easy magnetization in a vertical direction with respect to a film surface of the magnetic recording medium, and (b) provided as a magnetic recording head is a single-magnetic polar head having a main magnetic pole in a substantially rectangular shape.

Figure 2:
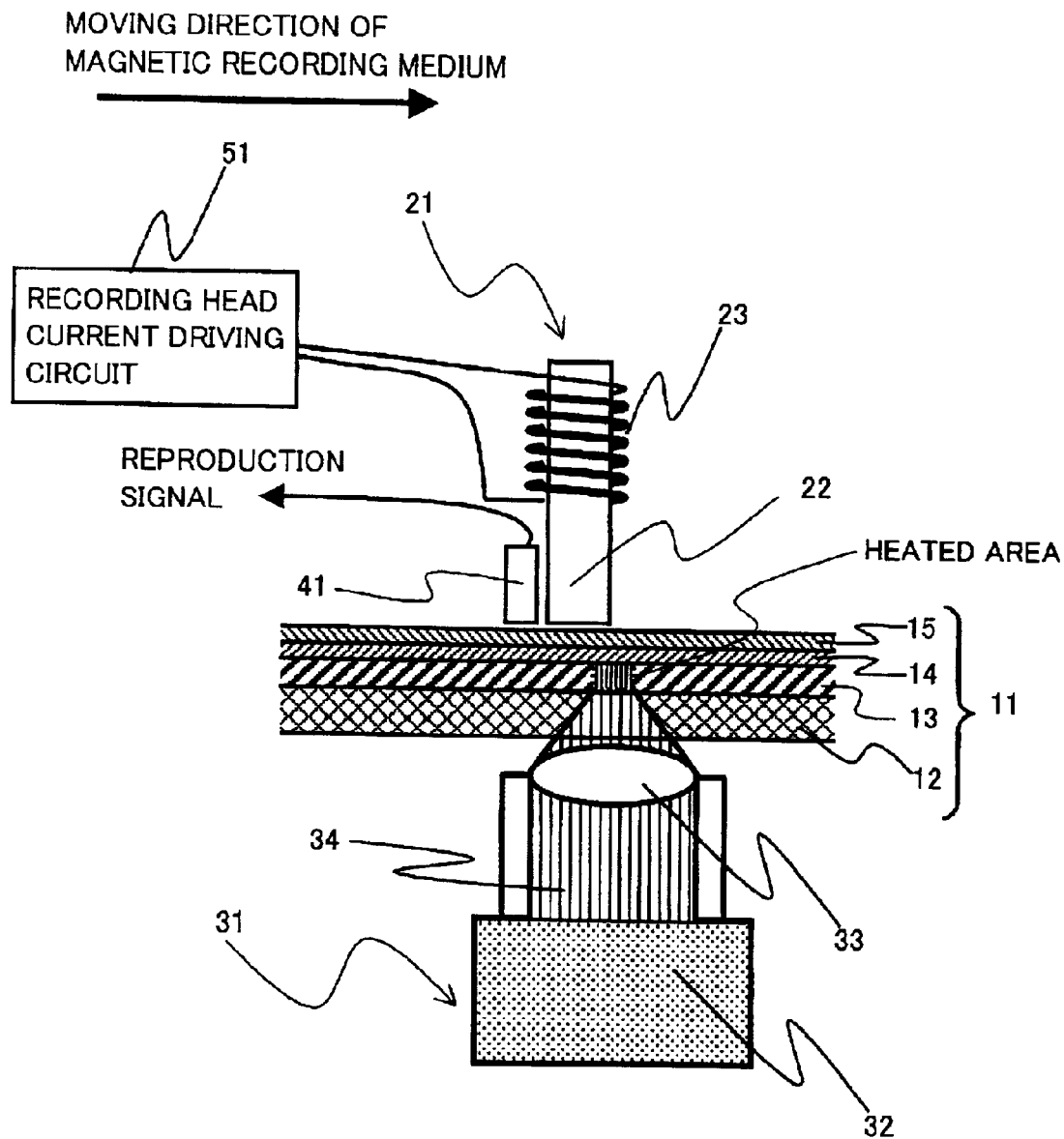
FIG. 2 is a schematic configuration diagram of a magnetic recording-reproduction apparatus in which the magnetic signal recording method of the present invention is employed and a single-magnetic polar head is used as a magnetic recording head.

A magnetic recording-reproduction apparatus of the present embodiment has such a configuration that, as shown in FIG. 2, a single-magnetic polar head 21 and an optical local heater 31 are disposed face to face, while sandwiching a magnetic recording medium 11 in between.

The magnetic recording medium 11, as indicated by an arrow in FIG. 2, is moved in a parallel direction with respect to the film surface. A recording track is formed on the magnetic recording medium 11 in the parallel direction with respect to the film surface. Therefore, in the present embodiment, the parallel direction with respect to the film surface is referred to as a track direction, while a direction to which the magnetic recording medium 11 is moved with a transit of time is denoted as a trailing track direction.

Moreover, the magnetic recording-reproduction apparatus is provided with a reproduction head 41, which is disposed in such a position that is adjacent to the single-magnetic polar heat 21 and in an in-track position in a leading track direction. The reproduction head 41 detects a magnetic flux leaked out of the magnetic recording medium 11 so as to detect magnetic information from the recording track formed on the magnetic recording medium 11. In addition, the reproduction head 41 is provided with a magnetic information detection region having a substantially rectangular shape.

The magnetic recording medium 11, as shown in FIG. 2, has such a multilayer structure. In the multilayer structure, (a) a magnetic recording layer 13 is laminated on a supporting base 12, which is smooth and has a disc shape, and (b) a protective layer 14 is formed on a top of the magnetic recording layer 13 so as to protect the magnetic recording layer 13, while (c) a lubricative layer 15 is formed on the protective layer 14, so that the magnetic recording medium 11 can be moved smoothly.

The supporting base 12 is made of a material transparent for most of laser beams projected from the optical local heater 31. For this reason, the magnetic recording medium 11 is disposed in such a manner that the supporting base 12 is on the side where the optical local heater 31 is positioned, while the lubricative layer 15 is on the side where the single-magnetic polar head 21 is located.

For the magnetic recording layer 13, used is a vertical magnetized layer having such a composition described as $Tb_{0.2}(Fe_{0.85}Co_{0.15})_{0.8}$. Therefore, in the present embodiment, it is assumed that the information is recorded only in a component, which is vertical with respect to the film surface, of a magnetic field applied on the magnetic recording layer 13 of the magnetic recording medium 11. Hereinafter, a coercive force applied onto the magnetic field of the magnetic recording layer 13, which is applied in the vertical direction with respect to the film surface, is referred to as a coercive force of the magnetic recording medium 11.

Figure 17:
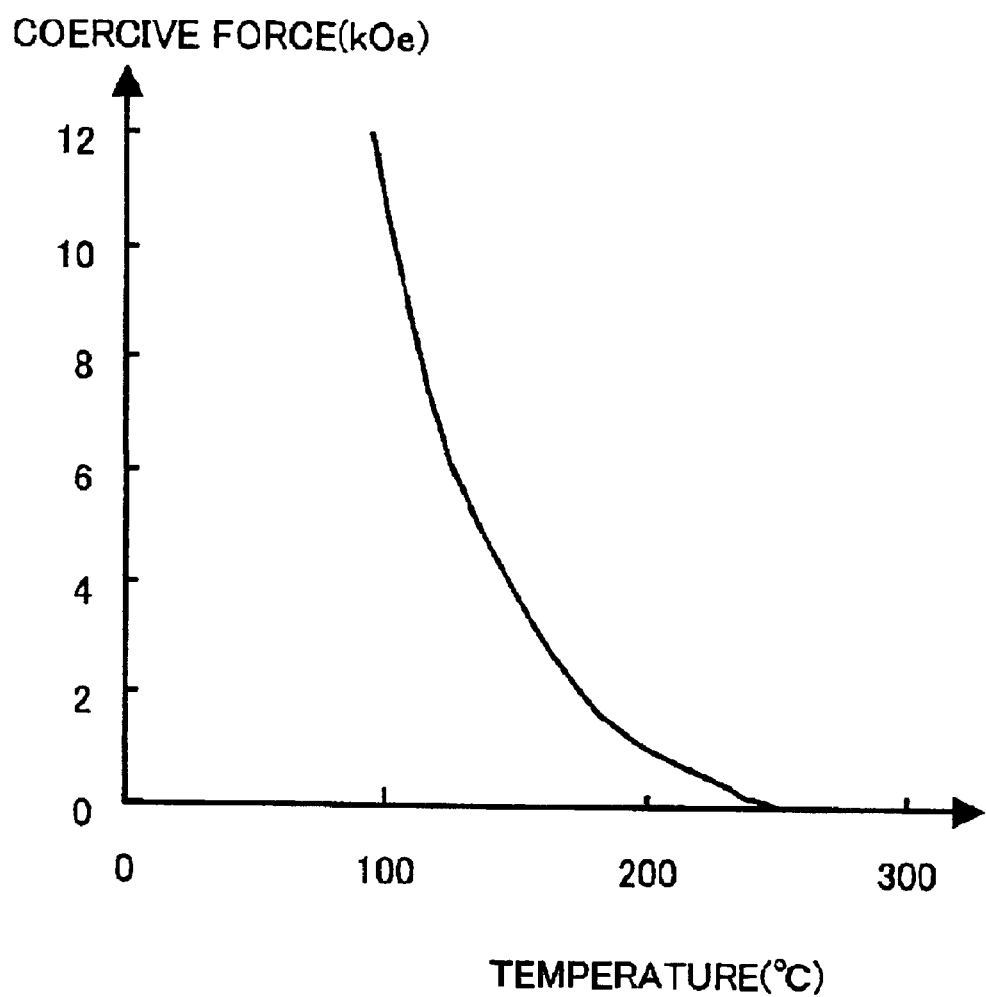
FIG. 17 is a graph illustrating how much a coercive force of a common heat-assisting magnetic recording medium is dependent on a temperature.
Figure 18:
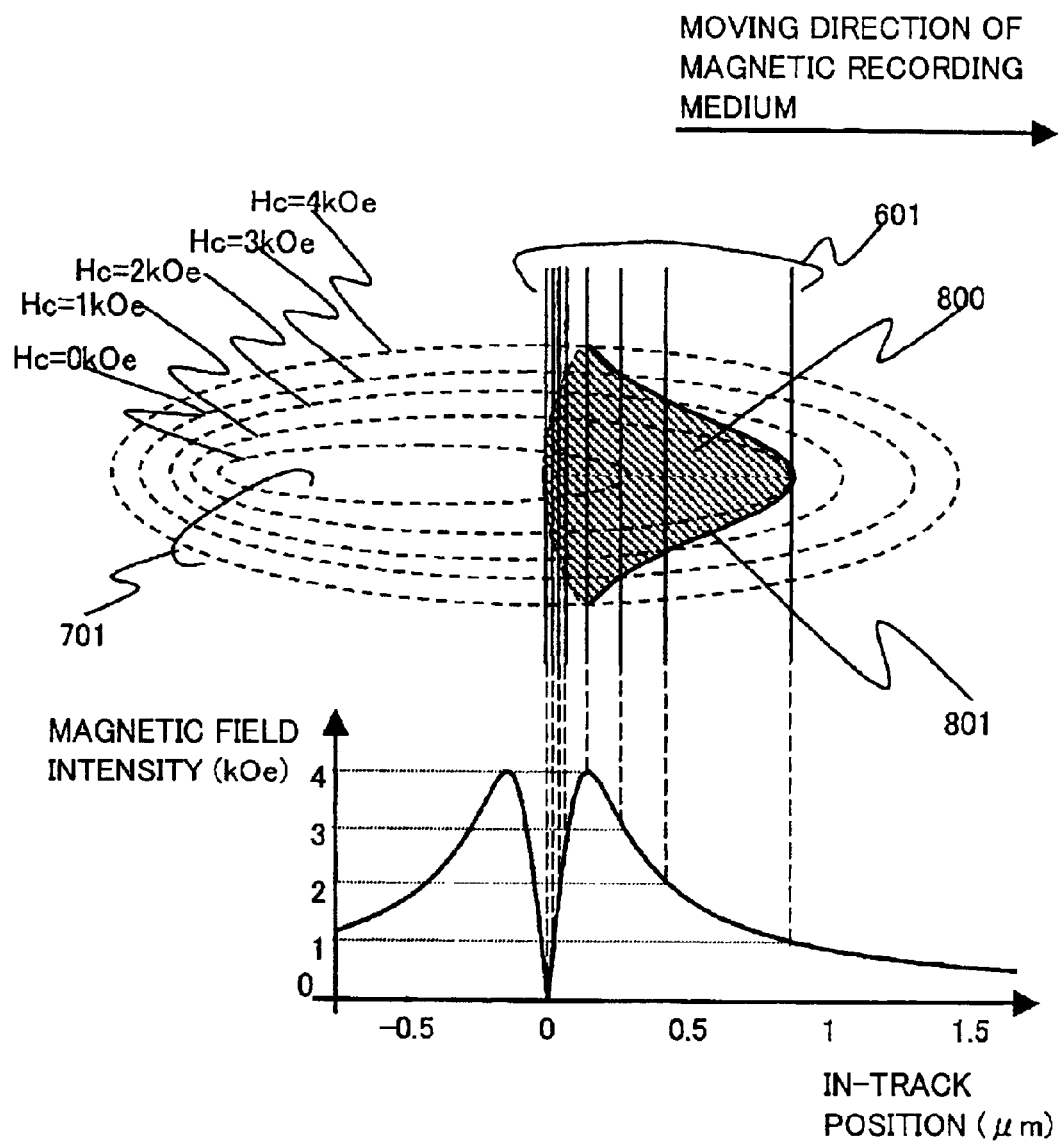
FIG. 18 is an explanatory view showing a shape of a magnetic bit formed by a conventional magnetic signal recording method, and a relationship of the shape of the magnetic bit with the coercive force and the magnetic field intensity.
Figure 19:
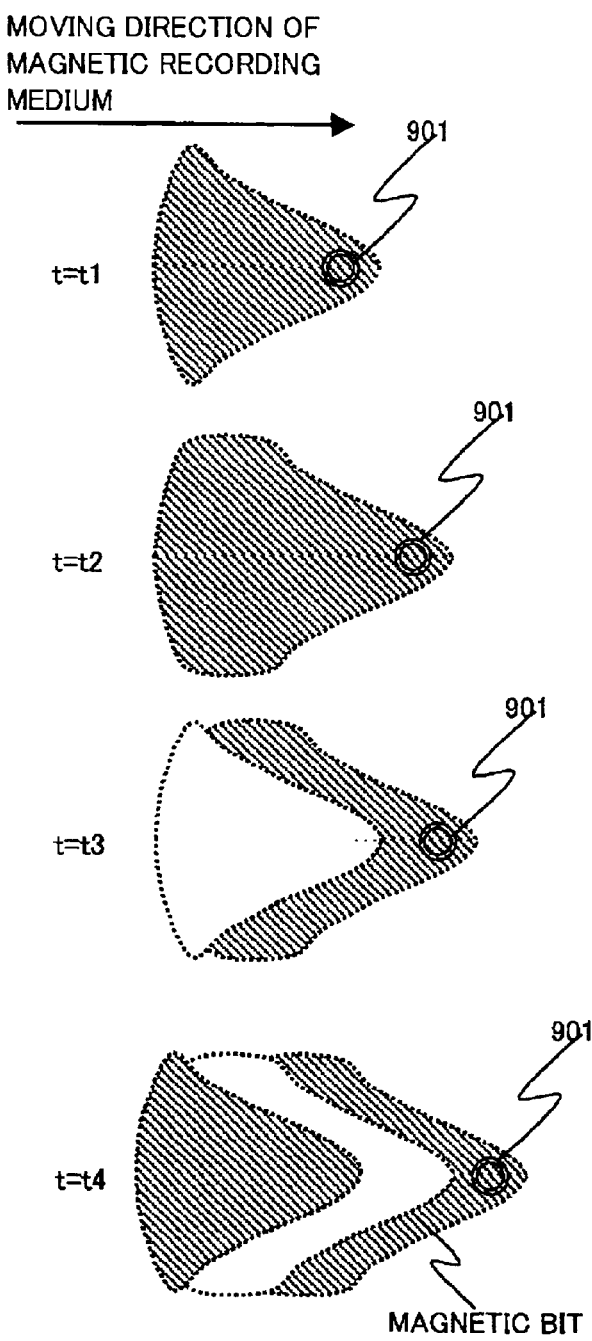
FIG. 19(a) is an explanatory view illustrating steps of forming the magnetic bit on the magnetic recording medium by using the magnetic bit shown in FIG. 18.
FIG. 19(b) is a timing chart of a driving current of a recording head in the steps of forming the magnetic bit shown in FIG. 19(a).
Figure 19:
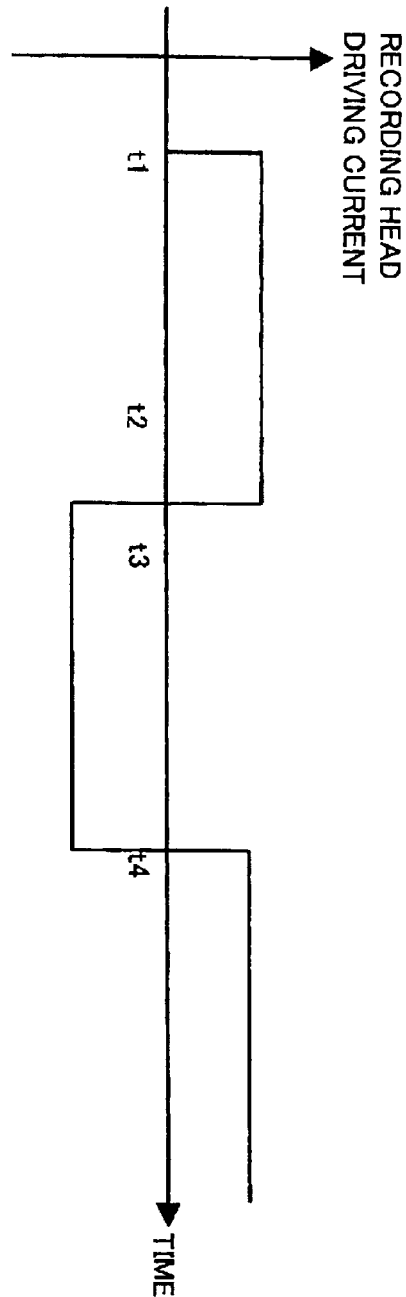
Figure 20:
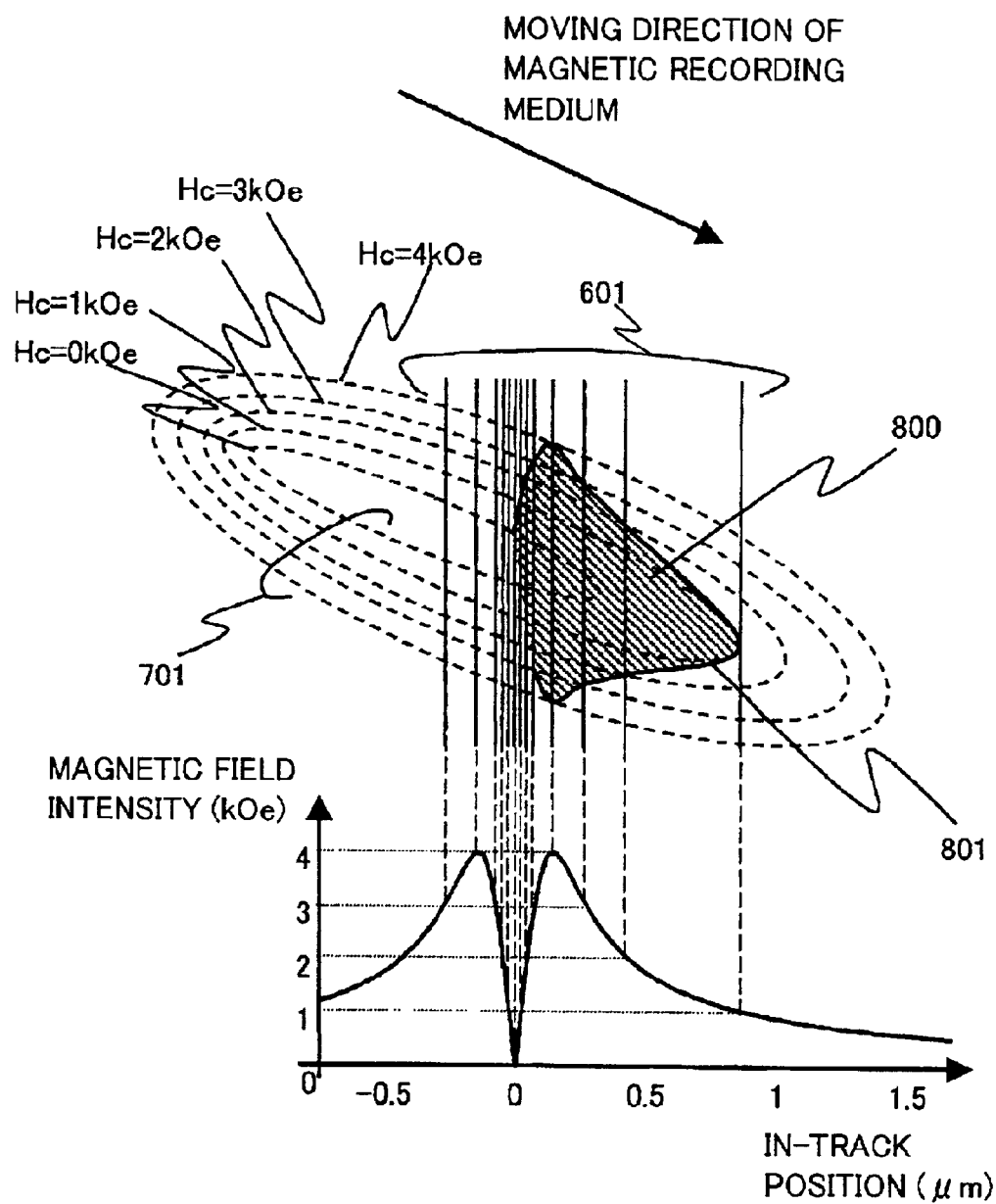
FIG. 20 is an explanatory view showing how the shape of the magnetic bit is changed when the relationship between the magnetic field distribution and the temperature distribution is changed, with respect to the relationship of the shape of the magnetic bit with the coercive force and the magnetic field intensity shown in FIG. 18.

The coercive force of the magnetic recording medium 11 is temperature-dependent, in the same fashion as the one shown in FIG. 17 as the prior art. In other words, the magnetic recording medium 11 has Curie temperature of about 250° C. Thus, the magnetic recording medium has such temperature characteristics that, as the temperature is lowered from the Curie temperature, the coercive forced is increased at a higher rate. That is, the coercive force of the magnetic recording medium 11 is greatly lowered by heating while a temperature is low, while the rate of lowering the coercive force is diminished as the temperature approaches the Curie temperature.

Note that, in the present embodiment and other embodiments explained in a later section, a wording "recording in a magnetic recording medium" generally means "recording in a magnetic recording layer of the magnetic recording medium". Thus, hereinafter, the wording "recording in a magnetic recording medium" indicates the recording in the magnetic recording layer of the magnetic recording medium, unless otherwise specified. In the same way, a wording "magnetic characteristics of the magnetic recording medium" means characteristics of the magnetic recording layer of the magnetic recording medium, unless otherwise specified.

The single-magnetic polar head 21 is constituted with a main magnetic pole 22, which has a substantially rectangular surface facing the magnetic recording medium 11, and a coil 23 that is bound around the main magnetic pole 22. In addition, the main magnetic pole 22 and the magnetic recording medium 11 are disposed to have a gap having a predetermined distance in between.

Both ends of the coil 23 are connected with a recording head current driving circuit 51 so as to flow a current via the coil 23 on recording the information in the magnetic recording medium 11. Therefore, when the current is flown via the coil 23 of the single-magnetic polar head 21, a magnetic field distribution is produced on the magnetic recording medium 11. The magnetic field distribution has a upward or downward direction in accordance with polarity of the current flowing the coil 23.

Note that, it is assumed that the main magnetic pole 22 of the single-magnetic polar head 21 is so disposed that at least one side of the trailing edge in the track direction makes a right angle with the track direction.

In the present embodiment, the recording of the information is carried out with respect to only the vertical direction to the film surface of the magnetic recording layer 13 of the magnetic recording medium 11. Thus, unless otherwise specified, the magnetic field, which is vertical to the film surface of the magnetic recording medium, is referred to as a vertical magnetic field, while intensity of the vertical magnetic field is denoted as vertical magnetic field intensity. Meanwhile, a recording magnetic field indicates the vertical magnetic field.

Figure 3:
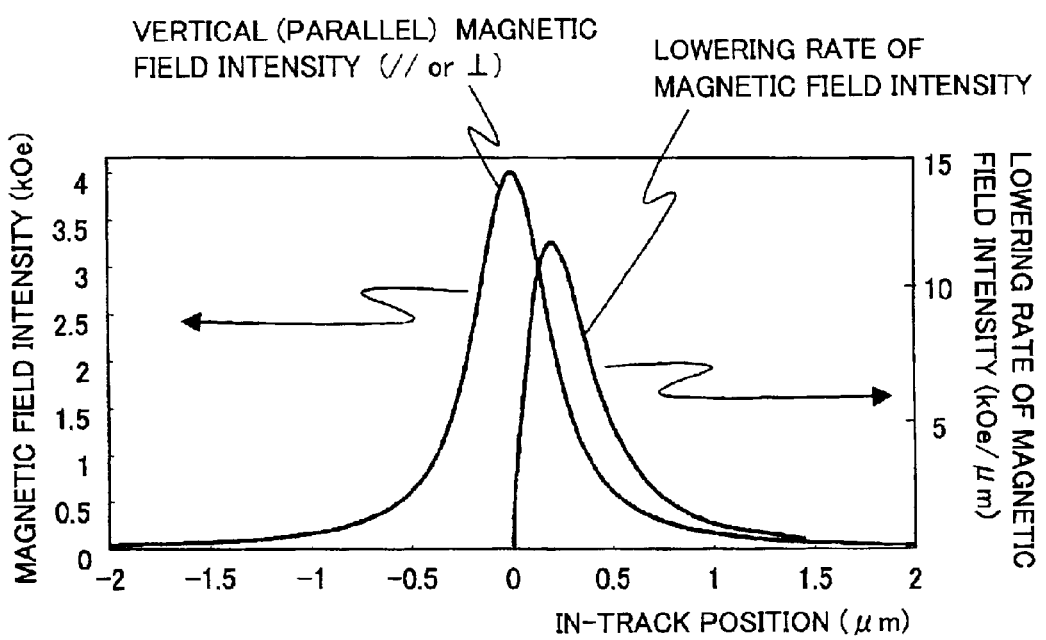
FIG. 3 is a graph showing (a) a relationship between vertical magnetic field intensity and parallel magnetic field intensity that are produced by the magnetic recording head and (b) a lowering rate of the magnetic field intensity and an in-track position on the magnetic recording medium.

A distribution of the vertical magnetic field intensity is described as a graph shown in FIG. 3. That is, a recording magnetic field is distributed in such a shape that is described in the graph in the FIG. 3. The shape of distribution indicates a shape of contour lines of the magnetic field intensity. Note that, in the graph of FIG. 3, a position of 0 μm, which is an origin of the track direction position, indicates a center of the track direction of the main magnetic pole 22 of the single-magnetic polar head 21. In addition, a graph showing a magnetic field intensity lowering rate, which will be explained later, is also presented in FIG. 3.

The optical local heater 31, as shown in FIG. 2, is provided with a laser projector 32 and optical convergent means 33 such as a convex lens and the like. With the optical convergent means 33, a laser beam projected from the laser projector 32 is converged into the magnetic recording layer 13 of the magnetic recording medium 11. In short, the optical local heater 31 projects the converged laser beam, which has been converged by the optical convergent means 33, in such a manner that the converged laser beam make a focus on the magnetic recording layer 13 via the supporting base 12 in the magnetic recording medium 11. By doing this, the optical local heater 31 optically heats up the magnetic recording layer 13 locally. (A region, which is locally heated up, is called as a heated region, hereinafter.)

In the heated region of the magnetic recording layer 13, the focus of the laser beam is free from aberration, while its optical intensity is distributed so that contour lines of the optical intensity makes concentric circles whose center is a center of the projection of the laser beam.

Note that, in the present first embodiment, for convenience to explain, it is assumed that the heating of the optical local heater 31 has a center in a position that is right below a trailing edge of the main magnetic pole 22 of the single-magnetic polar head 21 in the track direction. Meanwhile, it is also assumed that formed on the magnetic recording layer 13 is a temperature distribution described by contour lines in substantially concentric circles centered at the center of the heating.

Further, it is assumed that the main magnetic pole 22 of the single-magnetic polar head 21 has a width (main magnetic pole width) sufficiently wider than a track pitch, meanwhile the main magnetic pole 22 generates a magnetic field distribution, which is substantially bilaterally symmetrical with respect to the track direction, on the magnetic recording layer 13 of the magnetic recording medium 11.

Figure 1:
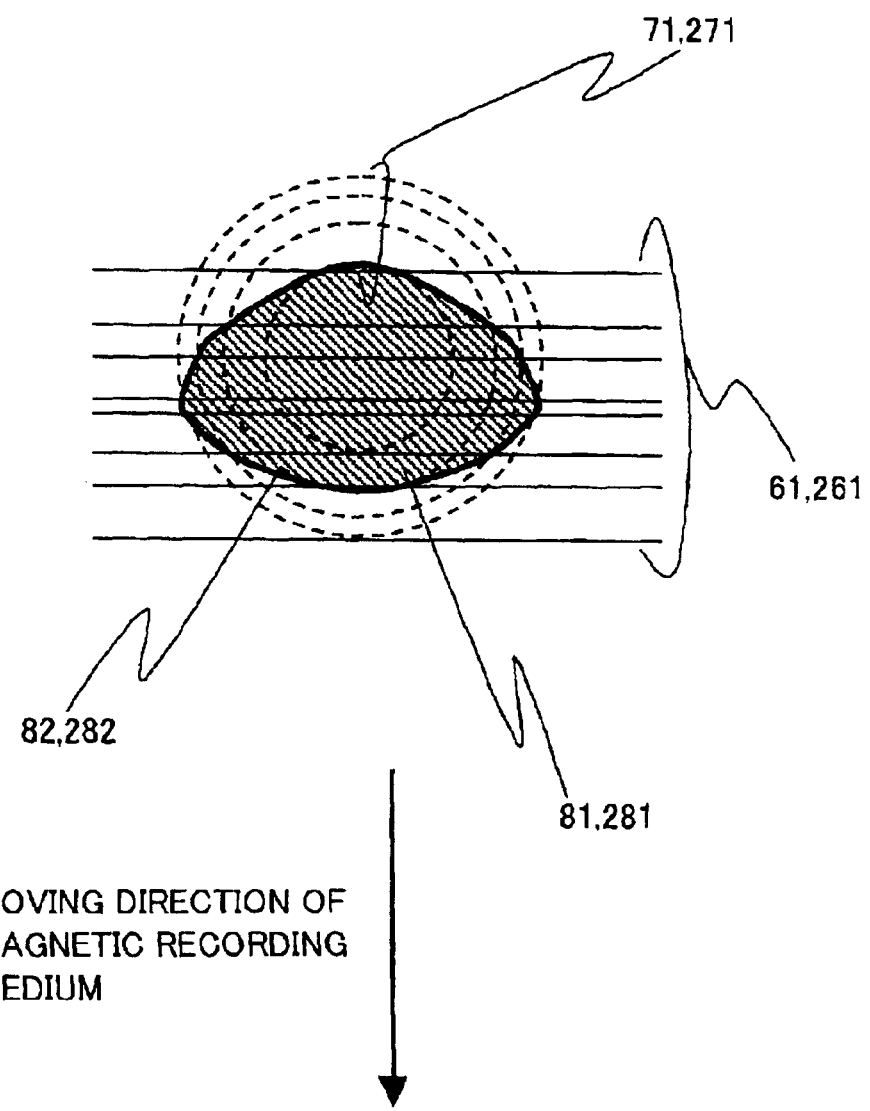
FIG. 1 is an explanatory view showing a magnetic bit formed on a magnetic recording medium by a magnetic signal recording method of the present invention.

With those conditions, as shown in FIG. 1, magnetic field intensity contour lines 61 and the coercive force contour lines 71 are determined. The magnetic field intensity contour lines 61 describe a vertical magnetic field on the magnetic recording medium 11, which generated by the single-magnetic polar head 21. The coercive force contour lines 71, which are applied on the vertical magnetic field, are determined from the temperature distribution generated on the magnetic recording medium 11 by the optical local heater 31. Shown in FIG. 4 is a position relationship between the magnetic field intensity contour lines 61 and the coercive force contour lines 71.

Figure 4:
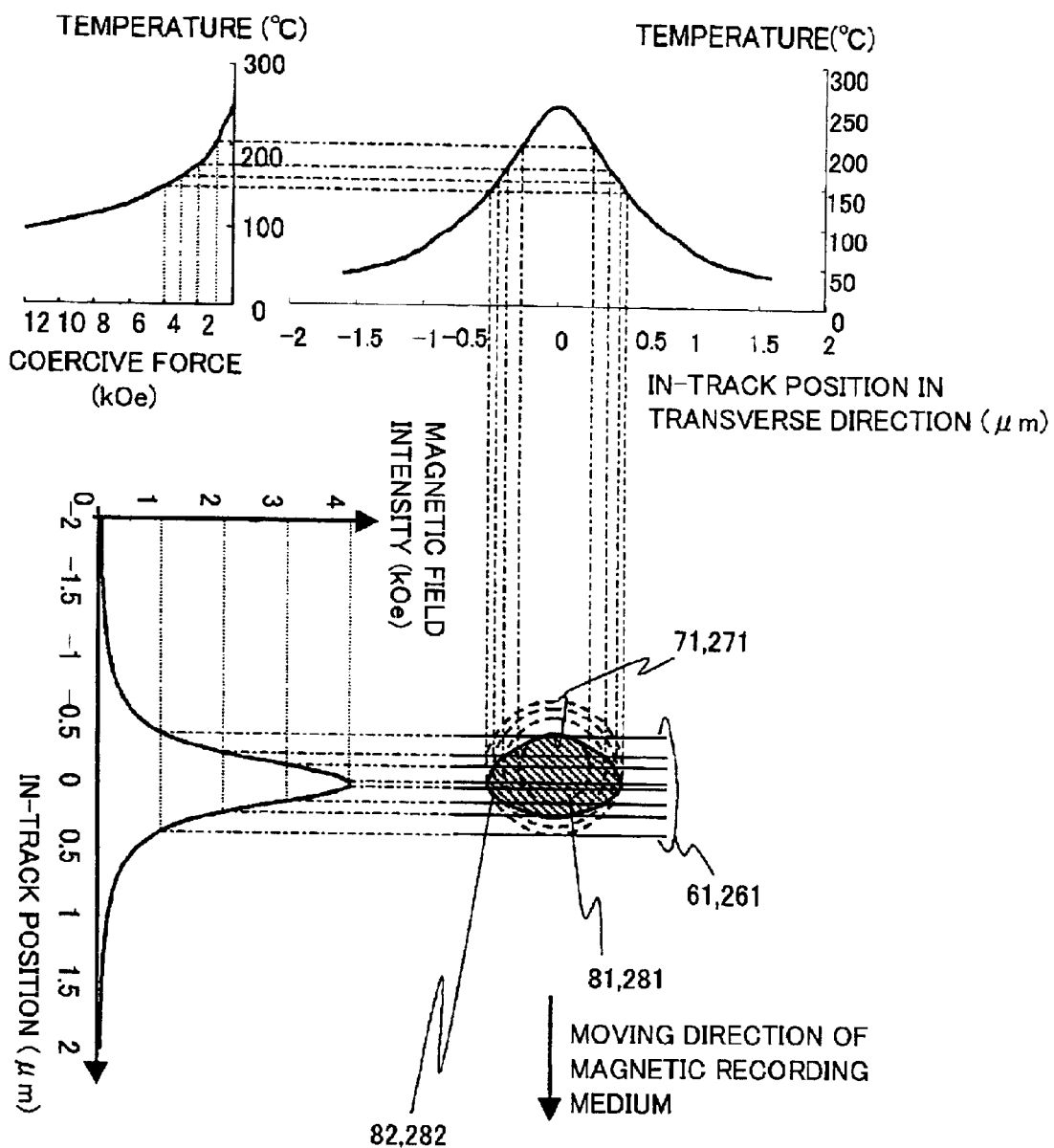
FIG. 4 is an explanation view illustrating a shape of the magnetic bit recorded by the magnetic signal recording method of the present invention and a relationship of the shape of the magnetic bit with a coercive force and the magnetic field intensity.

Here, a region, where magnetic recording is carried out in the magnetic recording layer 13 of the magnetic recording medium 11 by the single-magnetic polar head 21, is a region in which the vertical magnetic field intensity is greater than the coercive force of the magnetic recording layer 13, that is, a region highlighted by crosshatching in FIG. 4. The region is called a recordable region 81, hereinafter.

Moreover, just like in the explanation of the prior art, in the present embodiment, again, a magnetic bit has such a shape whose both ends in the track direction is identical with a trailing edge of the recordable region 81 in the track direction. Hereinafter, the trailing edge of the recordable region 81 in the track direction is referred to as a recording edge 82.

In other words, as the explanation of the prior art, the magnetic bit, as shown in FIGS. 5(a) and 5(b), is formed by magnetization of the magnetic recording medium 11 in one of directions that are vertical with respect to the film surface, while the magnetic recording medium is moved in a parallel direction with respect to the film surface. Note that, in FIG. 5(a), the movement of the magnetic recording medium 11 is indicated with an aid of a virtual mark 91 set on the magnetic recording medium 11. The magnetic bit attains a shape shown in FIG. 5(a), by inversion of polarity of a recording head driving current with a transit of time, while the magnetic recording medium 11 is moved as indicated by the virtual mark 91. The recording head driving current is supplied into the coil 23 that constitutes the single-magnetic polar head 21 that is the recording head, as shown in FIG. 5(b).

Therefore, FIG. 5(a) illustrates that the shape of the trailing edge of the recordable region 81 in the track direction, that is, the shape of the recording edge 82 is identical with a shape of both ends of a magnetic bit 100 in the track direction.

Here, as shown in FIG. 4, the vertical magnetic field intensity is significantly lowered in a position more distanced from the location right below the main magnetic pole (the position where the in-track position is at 0 µm). Therefore, compared with the conventional method, the recording edge 82 has a more linear shape. That is, the shape of the recording edge 82 attains a better approximation to the shape of the contour lines of the recording magnetic field distribution by positioning the recording edge 82, which is the edge of the recordable region 81, in a position in which the magnetic field intensity in the vertical magnetic field intensity (the recording magnetic field intensity) is decreased at the greatest lowering rate.

Moreover, since the single-magnetic polar head 21 has the main magnetic pole 22 whose surface facing the magnetic recording medium 11 is in a substantially rectangular shape, the recording magnetic field distribution has contour lines in the rectangular shape. For this reason, the magnetic bit recorded attains a shape that is more rectangular than the conventional method. Thus, even if high density recording is carried out in a bit direction, the reproduction head 41 having a rectangular shaped reproduction region can reproduce a reproduction signal having a high S/N.

Figure 6:
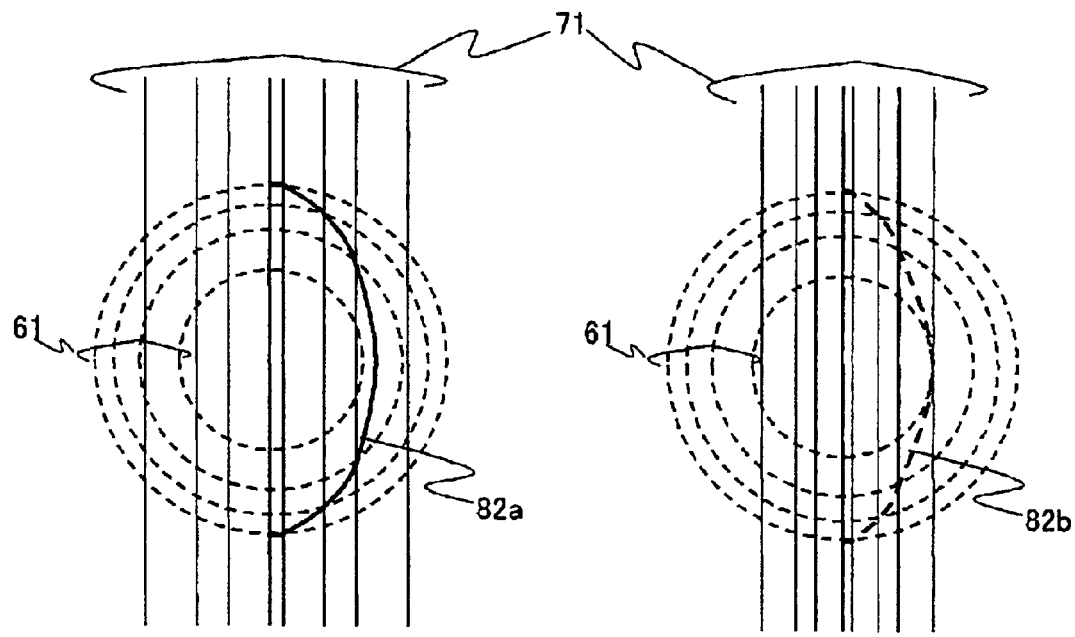
FIG. 6(a) is an explanatory view illustrating a magnetic bit having a different shape in accordance with a difference in a magnetic field distribution.
FIG. 6(b) is an explanatory view illustrating a magnetic bit having another different shape in accordance with a difference in a magnetic field distribution.
FIG. 6(c) is an explanatory view showing a comparison between a shape of an edge of the magnetic bit shown in FIG. 6(a) and that of the magnetic bit shown in FIG. 6(b).
Figure 6:
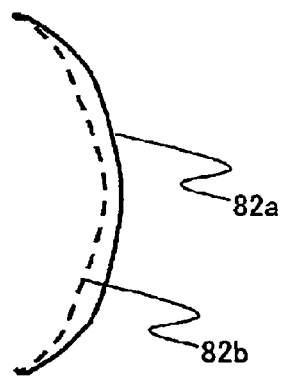

In FIGS. 6(a) and 6(b), shown is a relationship between (1) the lowering rate, at which the vertical magnetic field intensity generated on the magnetic recording layer 13 of the magnetic recording medium 11 by the single-magnetic polar head 21 is decreased in accordance with the position in the track direction, and (2) the shape of the recording edge 82. FIG. 6(a) illustrates a case where the coercive force contour lines 71 have a wide pitches between themselves, that is, the lowering rate of the vertical magnetic field intensity in accordance with the in-track position is small, while FIG. 6(b) shows the coercive force contour lines 71 has a narrow pitch, that is, the lowering rate of the vertical magnetic field intensity in accordance with the in-track position is large.

Therefore, as shown in FIG. 6(c), a more linear shape is attained by a recording edge 82b in FIG. 6(b) in which the lowering rate of the vertical magnetic field intensity in accordance with the in-track position is large, compared with a recording edge 82a shown in FIG. 6(a) where the lowering rate of the vertical magnetic field intensity in accordance with the in-track position is small. Thus, when the lowering rate of the vertical magnetic field intensity in accordance with the in-track position is large, it is possible to record the information by the magnetic bit having a shape that is more approximate to the rectangular shape.

Therefore, in order to record the magnetic bit in the shape that is more approximate to the rectangular shape, it is preferable that the vertical magnetic field intensity is lowered at a larger rate in accordance with the in-track position.

For this reason, it is effective to have a shorter distance in a vertical direction between the single-magnetic polar head 21 and the magnetic recording medium 11, that is, to have a smaller magnetic spacing between the single-magnetic polar head 21 and the magnetic recording medium 11.

According to the Karlqvist' theory, the vertical magnetic field intensity Hp (x, gp, sp) is determined as follows, $$Hp(x, gp, sp) = (\arctan((gp/2+x)/sp) + \arctan((gp/2-x)/sp)) \times HO,$$

where x is a position in the in-track position in which 0 is a position right below the center of the main magnetic pole 22 of the single-magnetic polar head 21, sp is the magnetic spacing, gp is a length of the main magnetic pole of the single-magnetic polar head in the track direction, HO is a constant, arctan (α) [rad] is an arc tangent of a variable α. According to calculation by the present inventors, between 0<gp [µm] and 0<sp [µm], the vertical magnetic field intensity is decreased to less than half of it when it is shifted from the trailing edge of the main magnetic pole in the track direction by a distance sp. In other words, it is $$Hp(gp/2+sp, gp, sp)/Hp(gp/2, gp, sp) > 0.5,$$

where gp>0 and sp>0.

Therefore, in case where the recording edge 82 is located in the region in which the vertical magnetic field intensity is reduced to its half, it is necessary that the magnetic spacing is smaller that a shortest magnetic bit length. This is a condition for not causing superposition of signals in a track-lateral direction with the magnetic bit in the leading and trailing edges, in a vicinity of the center of the shortest magnetic bit.

Moreover, the magnetic spacing locating below the magnetic recording medium 11 is greater, compared with that locating above the magnetic recording medium 11. Therefore, it is preferable that the magnetic recording layer 13 of the magnetic recording medium 11 has a thin film thickness. The calculation of the magnetic spacing can be applied in here. For example, in case a top surface of the magnetic recording medium 11 is adhered closely to the main magnetic pole 22 of the single-magnetic polar 21, it is necessary that the film thickness of the magnetic recording medium 11 is smaller than a targeted shortest magnetic bit length, in order to satisfy the above-mentioned conditions on a reverse surface of the magnetic recording medium 11.

Furthermore, it is effective to dispose a soft magnetic layer in a position facing the main magnetic pole 22 of the single-magnetic polar head 21, in such a fashion that the magnetic recording medium 11 is sandwiched between the soft magnetic layer and the main magnetic pole 22.

Moreover, it is also effective to make the main magnetic pole 22 of the single-magnetic polar head 21 shorter in length.

Note that, for convenience to explain, it is assumed above that the center of the heating of the optical local heater 31 is positioned right below the trailing edge of the main magnetic pole 22 of the single-magnetic polar head 21 in the track direction, while the vertical magnetic field intensity is lowered proportional to the distance from the position. However, if the recording edge 82 is located in the region in which the vertical magnetic field intensity is significantly lowered in accordance with the in-track position, the recording edge 82 has a shape more approximate to the shape of the contour lines of the recording magnetic field distribution. Accordingly, recorded is a magnetic bit having a substantially rectangular shape, if the shape of the contour lines of the magnetic recording distribution is rectangular. Therefore, in terms of the temperature distribution, coercive force distribution, and distribution of the vertical magnetic field intensity, which have been discussed in the present embodiment, the present invention is not limited to the present embodiment. Even if any of those conditions is different from that of the present embodiment, the shape of the recording edge can be set by employing the method discussed in the present invention, that is, by comparing between the coercive force and the vertical magnetic field intensity, thereby making it possible to examine the conditions to attain the shape of the magnetic bit, which is suitable for the reproduction performed by the reproduction head 41.

Moreover, in the embodiments, it is assumed that the coercive force contour lines make concentric circles. Therefore, the shape of the magnetic bit is almost unchanged even if no right angle is made between (a) the moving direction of the magnetic recording medium 11 and (b) the side of the trailing edge of the main magnetic pole 22 of the single-magnetic polar head 21 in the track direction.

Figure 7:
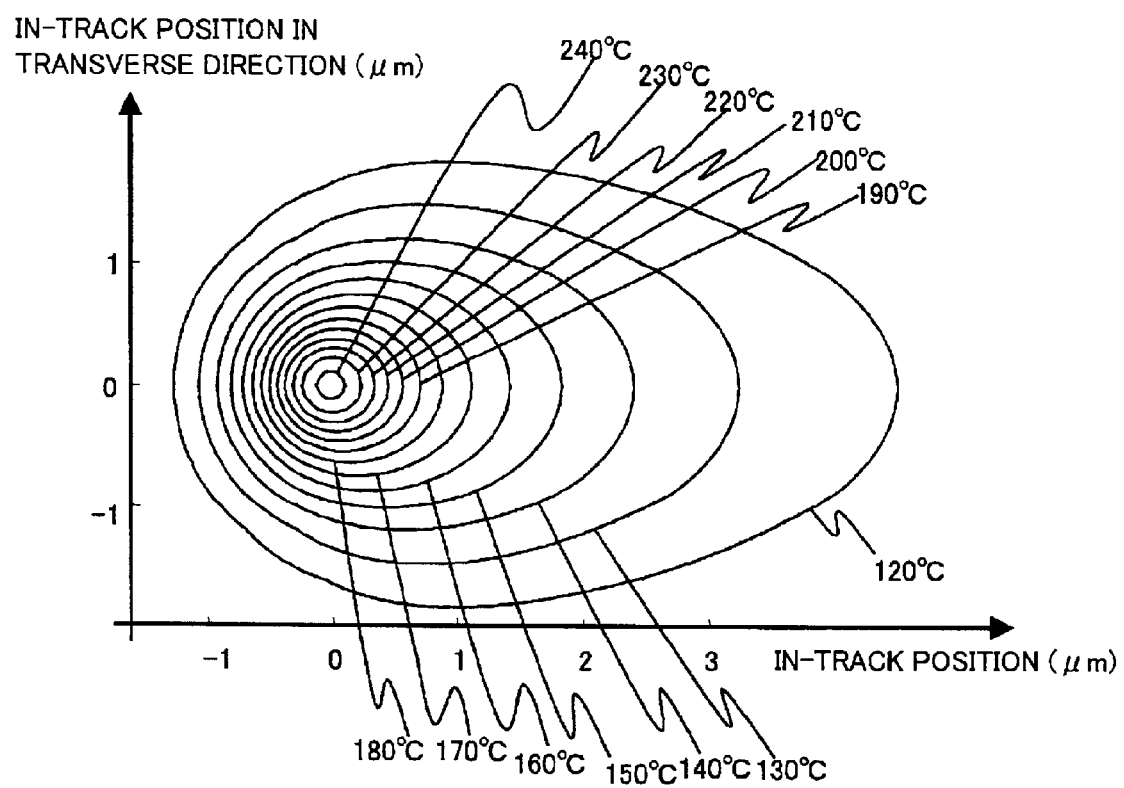
FIG. 7 is a schematic view illustrating, by using contour lines, a temperature distribution generated on the magnetic recording medium.

However, in reality, the magnetic recording medium 11 is moved with a certain linear velocity. Thus, the temperature distribution on the magnetic recording medium 11 is more spread as the magnetic recording medium 11 is moved to the trailing track direction. In FIG. 7, illustrated is a standard temperature distribution under the condition of experiments of the present inventors, where the magnetic recording medium 11 has a linear velocity of 10 m/sec.

FIG. 7 explains that the temperature distribution makes concentric circles in a region in 0.5 $\mu$m distanced from the center of the heating (the position of the 0 $\mu$m of the in-track position). In other words, when the recording is done in the region, the shape of the magnetic bit is almost unchanged even if no right angle is made between (a) the moving direction of the magnetic recording medium 11 and (b) the side of the trailing edge of the main magnetic pole 22 of the single-magnetic polar head 21 in the track direction.

In order to have the temperature distribution having the concentric circles, it is preferable to use an optical local heater 31 provided with a laser projector 32 having a concentric circular light intensity. Moreover, it is also possible to make the temperature distribution more approximate to the concentric circles by intermittent projection of the laser beam.

Moreover, it is considered that both the leading and trailing edges of the track are ended up mainly by increase in the coercive force due to the temperature drop. Therefore, in the above region, that is, a region having a low temperature, it is preferable that the coercive force is largely increased as the temperature decreases.

Furthermore, in general, the smaller the change in the coercive force, the more linear the recording edge 82. Therefore, it is preferable that the coercive force is lowered at a small rate in accordance with the temperature rise in the region other than both the leading and trailing edges of the track, that is, in a region having a high temperature.

In the present embodiment, in general, both the leading and trailing edges of the track have the lowest temperature. Therefore, it is possible to satisfy the two conditions mentioned above at once.

Figure 8:
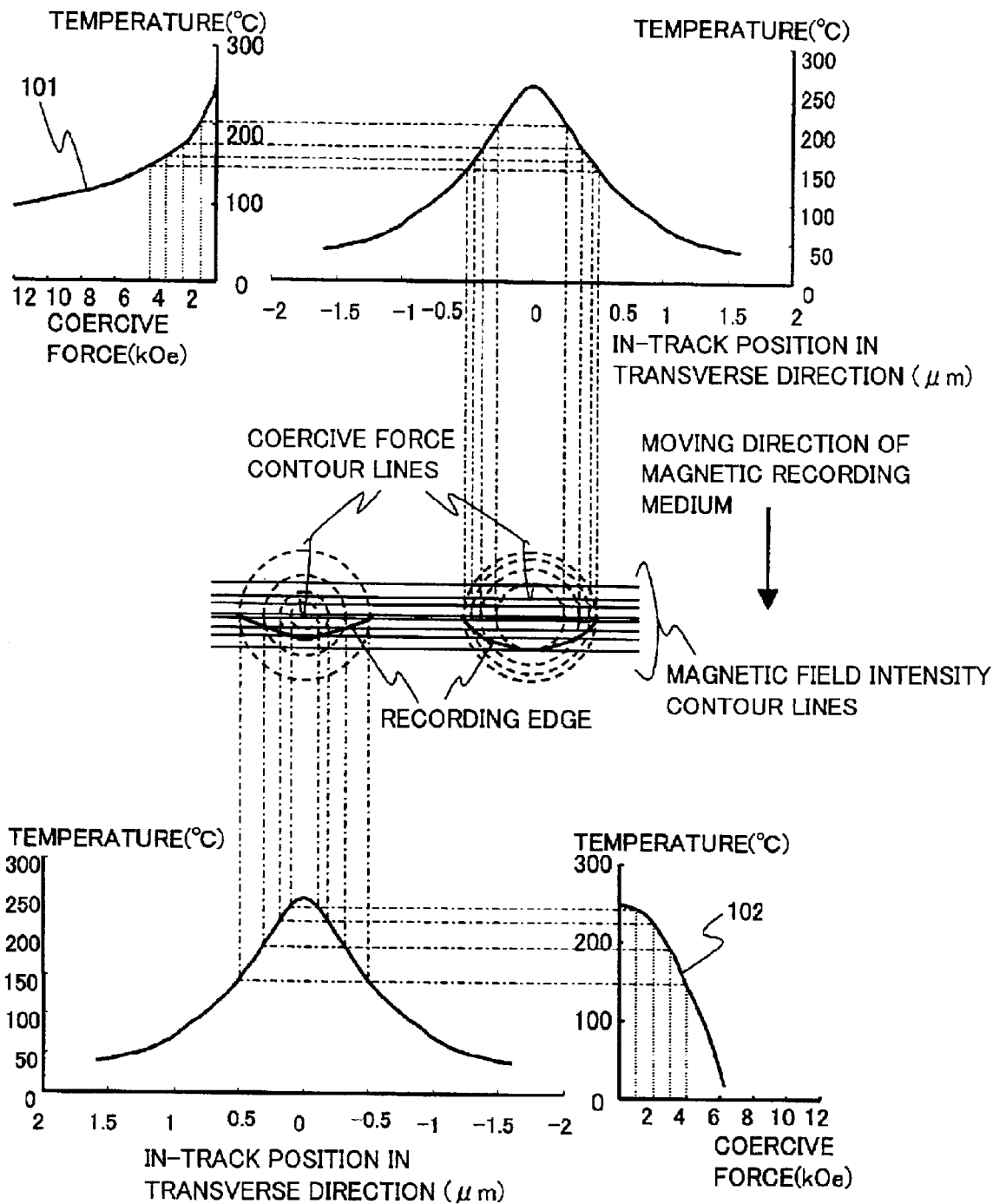
FIG. 8 is an explanatory view showing the shapes of the magnetic bits recorded on the magnetic recording medium by the magnetic signal recording method of the present invention, the shapes being different from each other in terms of temperature dependence of the coercive force of the magnetic recording medium.

To exemplify this, FIG. 8 shows a difference between shapes of recording edges of magnetic recording media A and B. As to the magnetic recording medium A, the coercive force decreases largely in the low temperature region and small in the high temperature region as the temperature rises in the magnetic recording medium A, meanwhile the coercive force in the magnetic recording medium B is lowered small in the low temperature region and largely in the high temperature region. In FIG. 8, a curve 101 indicates temperature dependence of the coercive force in the magnetic recording medium A, while a curve 102 illustrates temperature dependence of the coercive force of the magnetic recording medium B.

Figure 9:
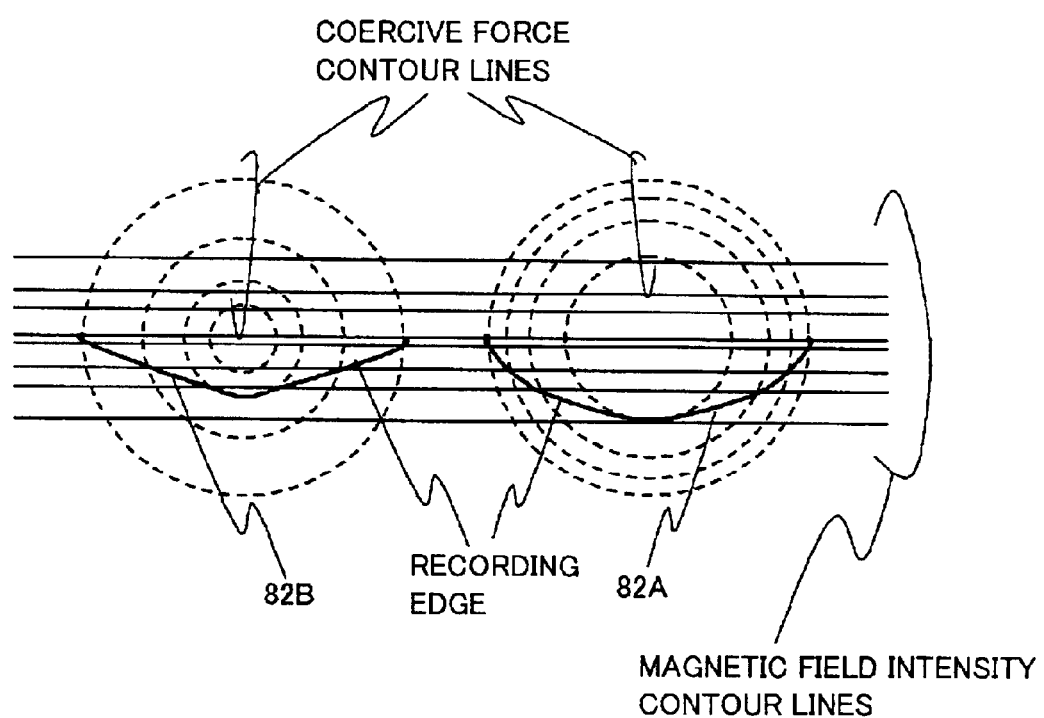
FIG. 9 is an enlarged view of the shapes of the magnetic bits shown in FIG. 8.

The magnetic recording media A and B have identical temperature distribution and vertical magnetic field intensity distribution. However, as shown in FIG. 9, the magnetic recording medium A has a recording edge 82A having a more linear shape vertical to the track, compared with a recording edge 82B of the magnetic recording medium B.

It should be noted that, in a vicinity of the position in which the vertical magnetic field intensity of the single-magnetic polar head 21 is largely dropped, the magnetic field intensity generated in a parallel direction to the film surface of the magnetic recording medium 11 attains is maximum. Therefore, for the sake of stable recording, it is preferable that the magnetic recording medium 11 has a larger magnetic anisotropy vertical to the film surface.

Moreover, in terms of the composition and the structure of the magnetic recording medium 11, the numerical values of the present embodiment are based on a case where a typical medium is produced by using apparatuses in a laboratory environment of the present inventors of the present application. However, the medium of the present invention is not limited to those discussed in the present embodiment, in terms of the structure, the raw materials, and the composition. For example, it is possible to realize the present invention by using an artificial lattice film having Co/Pt laminating layers, which is a vertical magnetic film showing high vertical magnetic anisotropy. In this case, laser power, the film thickness of the magnetic recording medium and the like conditions are, of course, changed in accordance with differences in the coercive force, the Curie temperature, heat transmittance, volume specific heat, and the like.

Moreover, of course, the present invention is not limited to the present embodiment, in terms of the coercive force of the magnetic recording medium 11, the magnetic field intensity and the magnetic field intensity distribution of the single-magnetic polar head 21, which are generated on the magnetic recording medium 11.

Furthermore, in the present embodiment, the optical local heater 31 is disposed so as to face the single-magnetic polar head 21 and so that the magnetic recording medium 11 is sandwiched between the optical local heater 31 and the single-magnetic polar head 21. It is also possible that the optical locally heading device 31 is disposed in the same side as the single-magnetic polar head 21 with respect to the magnetic recording medium 11, so that the converged laser beam is directly projected onto the film surface of the magnetic recording medium 11. In this case, of course, the supporting base 12 does not need to be made of raw materials that are transparent with respect to the laser beam.

Moreover, in the present embodiment, the temperature distribution formed by the optical local heater 31 is in substantial concentric circles. However, in case the side of the trailing edge of the main magnetic pole 22 of the single-magnetic polar head 21 makes a constant angle with the linear velocity of the magnetic recording medium 11 when other recording addresses are accessed, or in case no problem is caused in terms of processing the signal even if the angle is not constant, the present invention is not limited to the present embodiment.

In addition, even if the single-magnetic polar head has no rectangular shape, thereby having the magnetic field-applied region in a non-rectangular shape, the magnetic bit recorded attains both leading and trailing edges in the track direction in a shape approximate to a trailing edge of the magnetic field-applied region when the magnetic field intensity dramatically decreases as the distance from the magnetic field-applied region gets greater. Additionally, if the coercive force distribution can be described by the contour lines in substantially concentric circles, the shape of the magnetic field is almost unaffected by a change in the relationship between the moving direction of the recording medium and the single-magnetic polar head in terms of the angle. For this reason, it is possible to use a reproduction head having a magnetic information detection region whose shape is approximate to the shape of the trailing edge of the magnetic field-applied region.

In any of the cases mentioned above, the shape of the magnetic field distribution required to realize the present apparatus is determined in accordance with an ability of signal reproduction means, while considering contribution of each part of the magnetic recording medium 11 to the reproduction of the reproduction signal.

[Second Embodiment]

Another embodiment of the present invention is described below.

It should be noted that, in the present embodiment, explained is a case where a ring head having a recording gap in a substantially rectangular shape is used as a magnetic recording head. Moreover, for convenience to explain, sections having the same function as those of the first embodiment are labelled in an identical manner and their explanation is omitted here.

Figure 11:
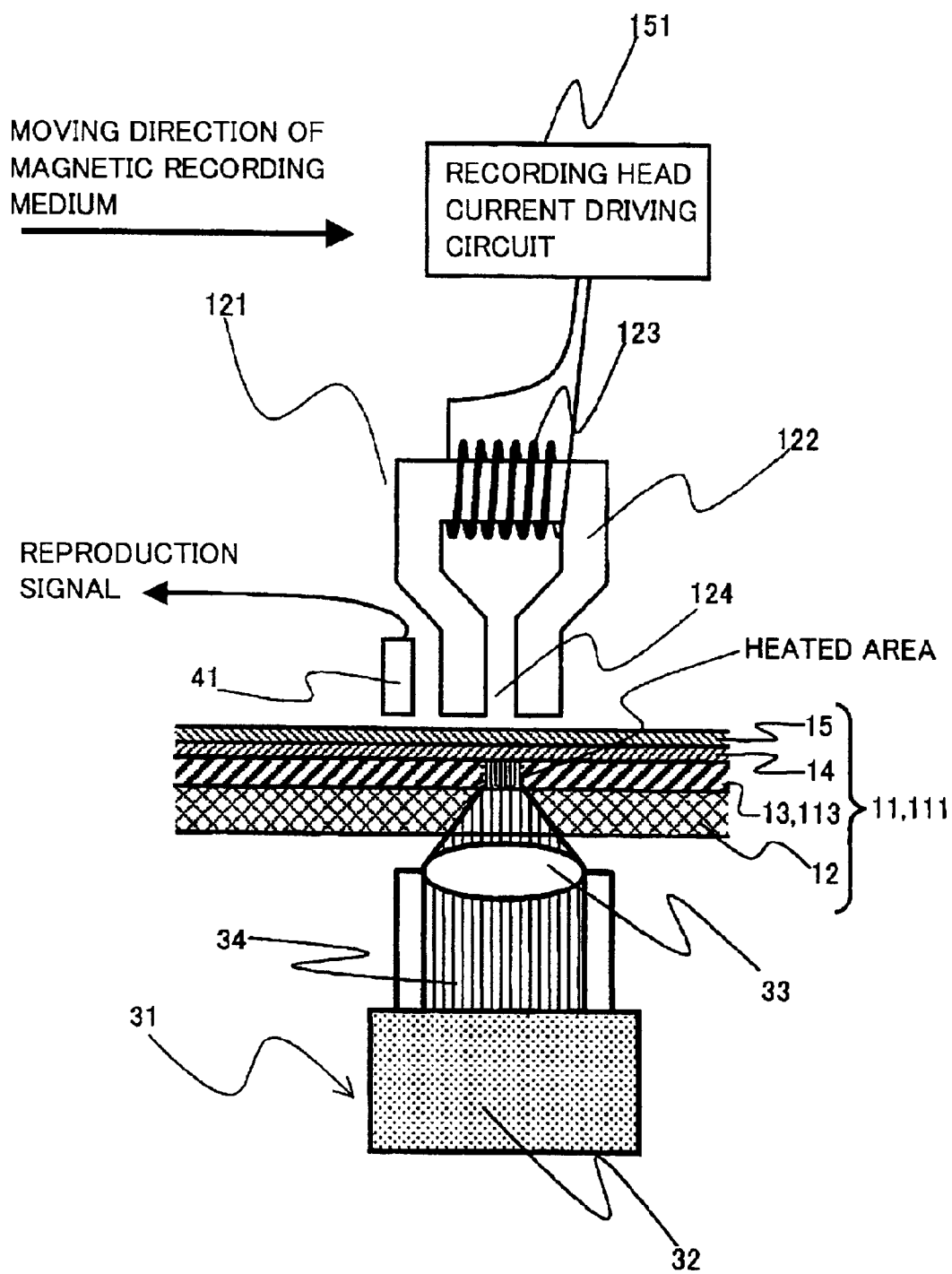
FIG. 11 is a schematic configuration diagram of a magnetic recording-reproduction apparatus in which the another magnetic signal recording method of the present invention is employed and a ring head is used as a magnetic recording head.

A magnetic recording-reproduction apparatus of the present embodiment is, as shown in FIG. 11, provided with a ring head 121, instead of the singular-magnetic polar head 21, which is disposed in the magnetic recording-reproduction apparatus of the first embodiment.

Therefore, in the magnetic recording-reproduction apparatus, as shown in FIG. 11, the ring head 121 and an optical local heater 31 are disposed face to face, while sandwiching a magnetic recording medium 11 between themselves. The magnetic recording medium 11 is moved in a direction parallel to a film surface of the magnetic recording medium 11. Because a recording track is formed in the moving direction of the magnetic recording medium 11, hereinafter, the moving direction of the magnetic recording medium 11 is referred to as a track direction and a direction toward which the magnetic recording medium 11 is moved with a transit of time is denoted as a trailing track direction.

A reproduction head 41 is, as discussed in the first embodiment, detects a magnetic flux leaked out of the magnetic recording medium 11, so as to detect magnetic information from the recording track formed on the magnetic recording medium 11. Note that, the reproduction head 41 has a magnetic information detection region in a substantially rectangular shape, and is disposed in a predetermined position with respect to the ring head 121.

The recording medium 11 is same as the one used in the first embodiment. In short, the present embodiment carries out recording only by utilizing a vertical component of the magnetic field on the film surface of the magnetic recording medium 11. Here, a vertical component of the magnetic field is a component of the magnetic field vertical to the film surface of the magnetic recording medium 11. Hereinafter, a coercive force of the magnetic field applied in the direction vertical to the film surface is referred to as a coercive force of the magnetic recording medium 11.

The ring head 121 is composed of a magnetic core 122, and a coil 123 tied around the magnetic core 122. Further, both ends of the coil 123 are connected with a recording head current driving circuit 151, which flows a current into the coil 123 on recording information in the magnetic recording medium 11.

The magnetic core 122 has a recording gap 124 in a substantially rectangular shape. Because of the recording gap 124, a magnetic field distribution is formed on the magnetic recording medium 11, upward or downward with respect to the film surface, in accordance with polarity of the current flowing through the coil 123. Note that, the ring head 121 is disposed so as to make a right angle between a side of a leading edge in track direction of the recording gap 124 and the track direction, at least.

In the present embodiment, the recording of the information is only carried out with respect to the direction vertical to the film surface of the magnetic recording medium 11. Therefore, hereinafter, unless otherwise specified, in terms of a magnetic field generated on the magnetic recording medium 11 by a ring head 121, a magnetic field in a direction vertical to the film surface is referred to as a vertical magnetic field, while intensity of the vertical magnetic field is denoted as vertical magnetic field intensity.

Figure 12:
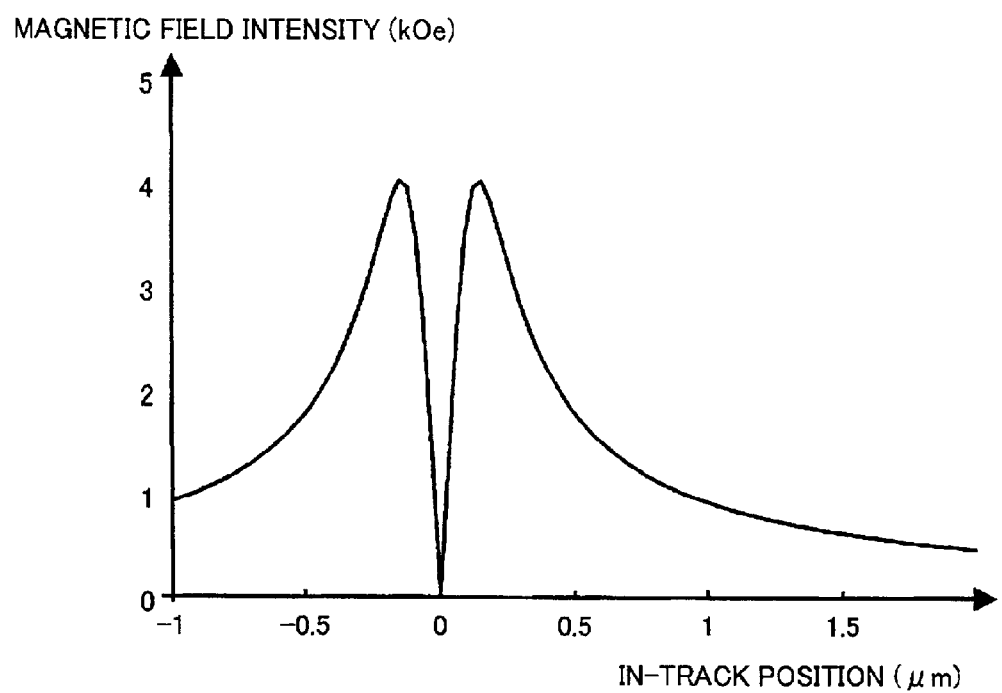
FIG. 12 is a graph showing a vertical magnetic field intensity of the ring head.

The vertical magnetic field is assumed to have a distribution of intensity as shown in FIG. 12. Note that, in this case, an original point of a position in the track direction is at a center of the track direction of the recording gap 124 of the ring head 121.

With the optical local heater 31, as the first embodiment, coherent light 34, which is a converged laser beam focused on a magnetic recording layer 13 of the magnetic recording medium 11 via a supporting base 12, is projected so as to optically heat up a part of the magnetic recording layer 13, locally.

An image of the focus is almost free from aberration, while a light intensity of the focus is distributed so that its contour lines make concentric circles in which a center of the concentric circles is a center of the projection.

Note that, for convenience to explain, it is assumed that a center of heating of the optical local heater 31 is located in the leading edge of the recording gap 124 of the ring head 121 in the track direction, while formed on the magnetic recording layer 13 of the magnetic recording medium 11 is a temperature distribution that is described by contour lines in substantially concentric circles whose center is the center of the heating of the optical local heater 31.

It is also assumed that the recording gap 124 of the ring head 121 has a gap width sufficiently wider than a track pitch, and generates a magnetic field, which is bilaterally symmetric with respect to the track direction, on the magnetic recording layer 13 of the magnetic recording medium 11.

Figure 10:
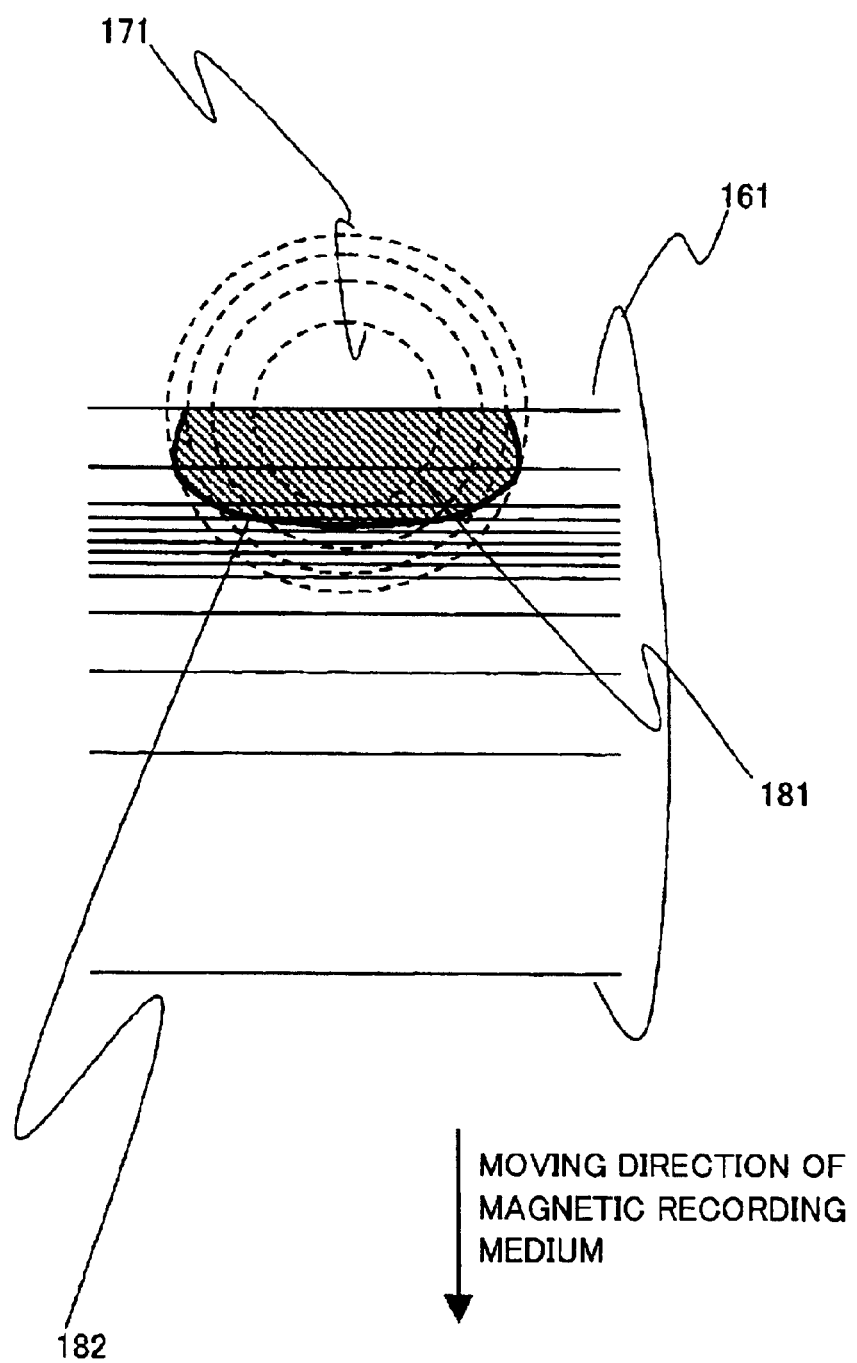
FIG. 10 is an explanatory view illustrating a magnetic bit formed on the magnetic recording medium by another magnetic signal recording method of the present invention.
Figure 13:
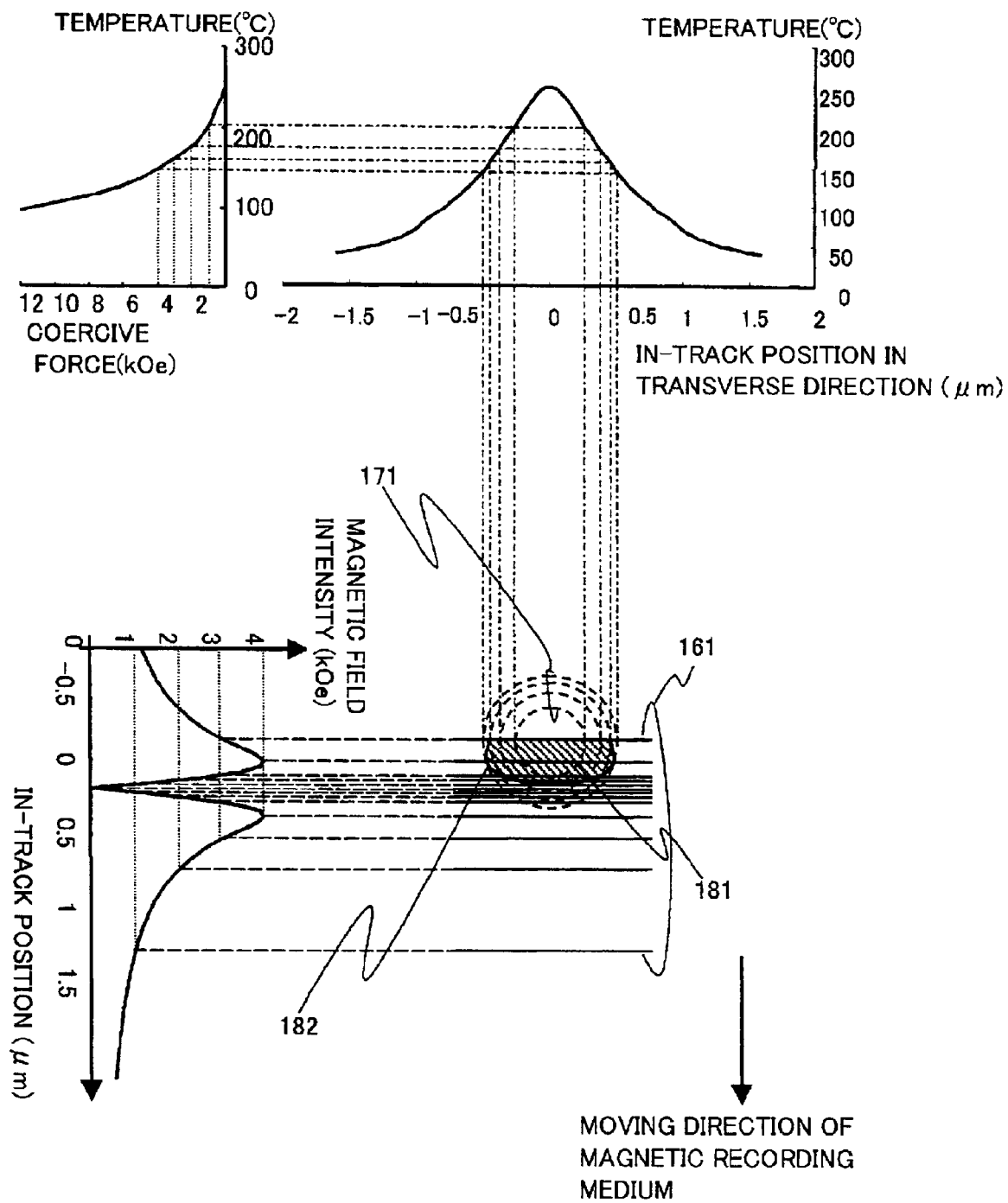
FIG. 13 is an explanatory view illustrating a shape of the magnetic bit recorded by the another magnetic signal recording method of the present invention and a relationship of the shape of the magnetic bit with a coercive force and the magnetic field intensity.

The above conditions determine, as shown in FIG. 10, (a) magnetic field intensity contour lines 161 of the vertical magnetic field generated on the magnetic recording medium by the ring head 121, and (b) coercive force contour lines 171, which is applied on the vertical magnetic field. The coercive force contour lines 171 is determined from the temperature distribution on the magnetic recording medium 11 by the optical local heater 31. In FIG. 13, the positional relationship between the magnetic field intensity contour lines 161 and the coercive force contour lines 171 is illustrated.

Here, a region, in which the ring head 121 carries out magnetic recording in the magnetic recording layer 13 of the magnetic recording medium 11, is a region where the vertical magnetic field intensity is greater than the coercive force of the magnetic recording layer 13, that is, a region highlighted by crosshatching in FIG. 13. The region is referred to as a recordable region 181.

In addition, as discussed in the explanation of the prior art, in the present embodiment, again, a shape of both ends of a magnetic bit in the track direction is identical with a shape of a trailing edge of the recordable region 181 in the track direction. Hereinafter, the trailing edge of the recordable region 181 in the track direction is referred to as a recording edge 182.

Here, as shown in FIG. 13, the vertical magnetic field intensity is dramatically decreased as a distance from a position right below a main magnetic pole (where an in-track position is 0 μm) gets greater. Therefore, the recording edge 182 attains a more linear shape, compared with the prior art. In other words, when the recording edge 182 of the recordable region 181 is located in a position in which the vertical magnetic field intensity (recording magnetic field intensity) is decreased at a largest lowering rate, the shape of the recording edge 182 attains a better approximation to a shape of contour lines of a recording magnetic field distribution.

Moreover, the magnetic core 122 of the ring head 121 has the recording gap 124 that is in a substantial rectangle shape, so that the contour lines of the recording magnetic field distribution is rectangularly shaped. This gives the recorded magnetic bit a shape that is more rectangle, compared with the prior art. Therefore, even in case of high density recording in a bit direction, it is possible to attain a reproduction signal having a high S/N, by using the reproduction head 41 having a rectangular-shaped reproduction region.

Even if the vertical magnetic field intensity, which is generated on the magnetic recording layer 13 of the magnetic recording medium 11 by the reign head 121, is dramatically decreased in accordance with the in-track position, the result is same as the first embodiment. That is, if the vertical magnetic field intensity is largely decreased in accordance with the position, the recording edge 182 is more linear, while the shape of the magnetic bit recorded in the magnetic recording medium 11 is more rectangular.

Therefore, in the present invention, again, it is preferable that the vertical magnetic field intensity is largely decreased in accordance with the position, in order to record the magnetic bit having the more rectangular shape.

To achieve this, it is effective that a distance between the ring head 121 and the direction vertical to the film surface of the magnetic recording layer 13 of the magnetic recording medium 11, that is magnetic spacing, is small, as the first embodiment. Moreover, it is preferable that the magnetic recording layer 13 has a thinner film thickness.

Furthermore, it is also effective to dispose a soft magnetic layer in such a position that faces the recording gap 124 of the ring head 121, thereby sandwiching the magnetic recording medium 11 in between.

Moreover, it is also effective to let the recording gap 124 of the ring head 121 have a track direction of a shorter length. However, as shown in FIG. 12, the vertical magnetic field intensity is increased again after the substantial middle (where the in-track position is 0 μm) of the recording gap 124 of the ring head 121. Thus, after passing the substantial middle of the recording gap 124, it is necessary that the coercive force of the magnetic recording layer 13 of the magnetic recording medium 11 is greater than the vertical magnetic field intensity. If this is not satisfied, that is, in case where the coercive force of the magnetic recording layer 13 of the magnetic recording medium 11 is smaller than the vertical magnetic filed intensity, attained is a recordable region (highlighted by crosshatching in FIG. 14), as shown in FIG. 14.

Figure 14:
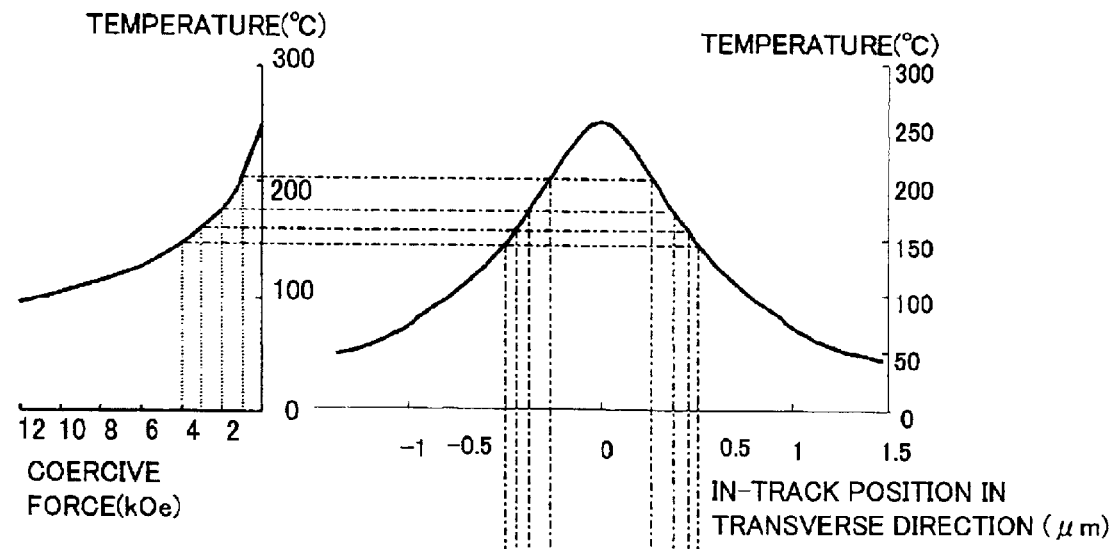
FIG. 14 is an explanatory view showing a relationship of the shape of the magnetic bit with a coercive force and the magnetic field intensity in case a magnetic field distribution and a temperature distribution are not adequate, on the contrary to the case shown in FIG. 13.
Figure 14:
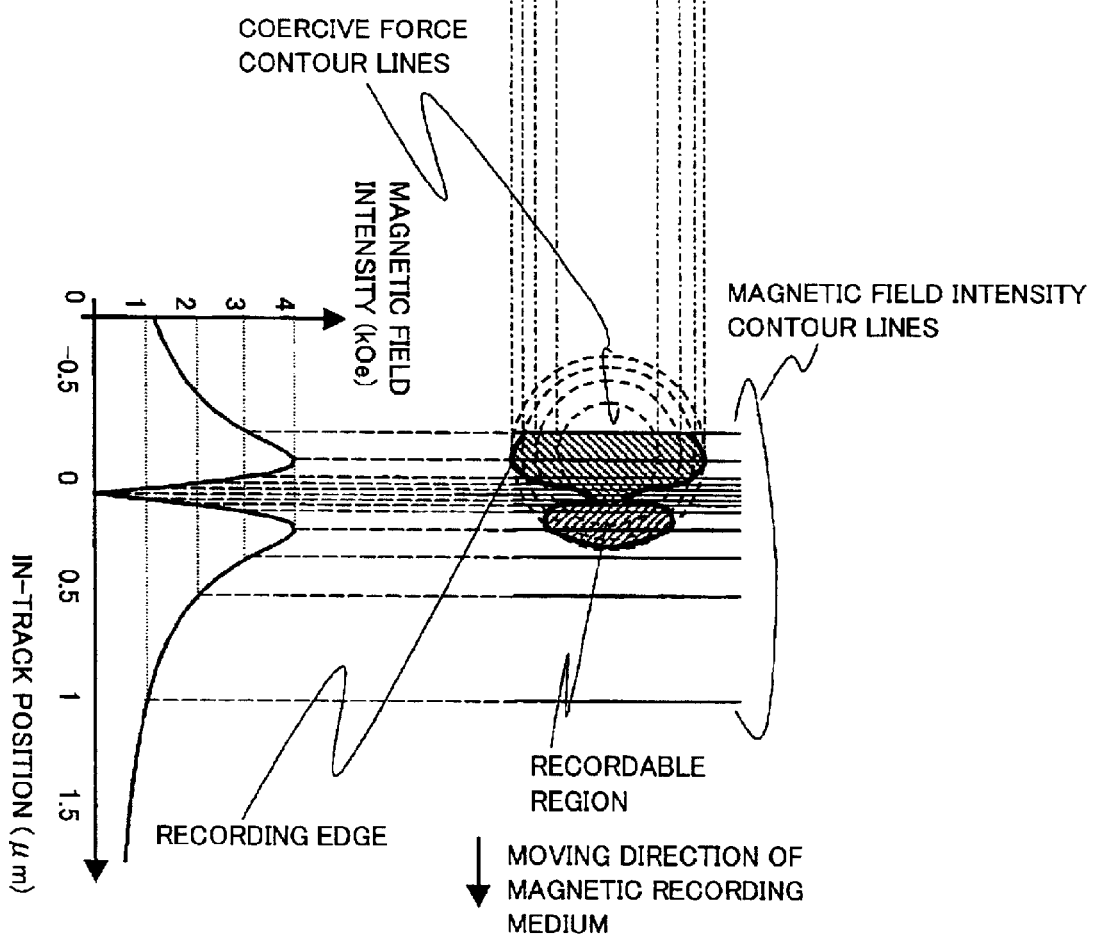
Figure 15:
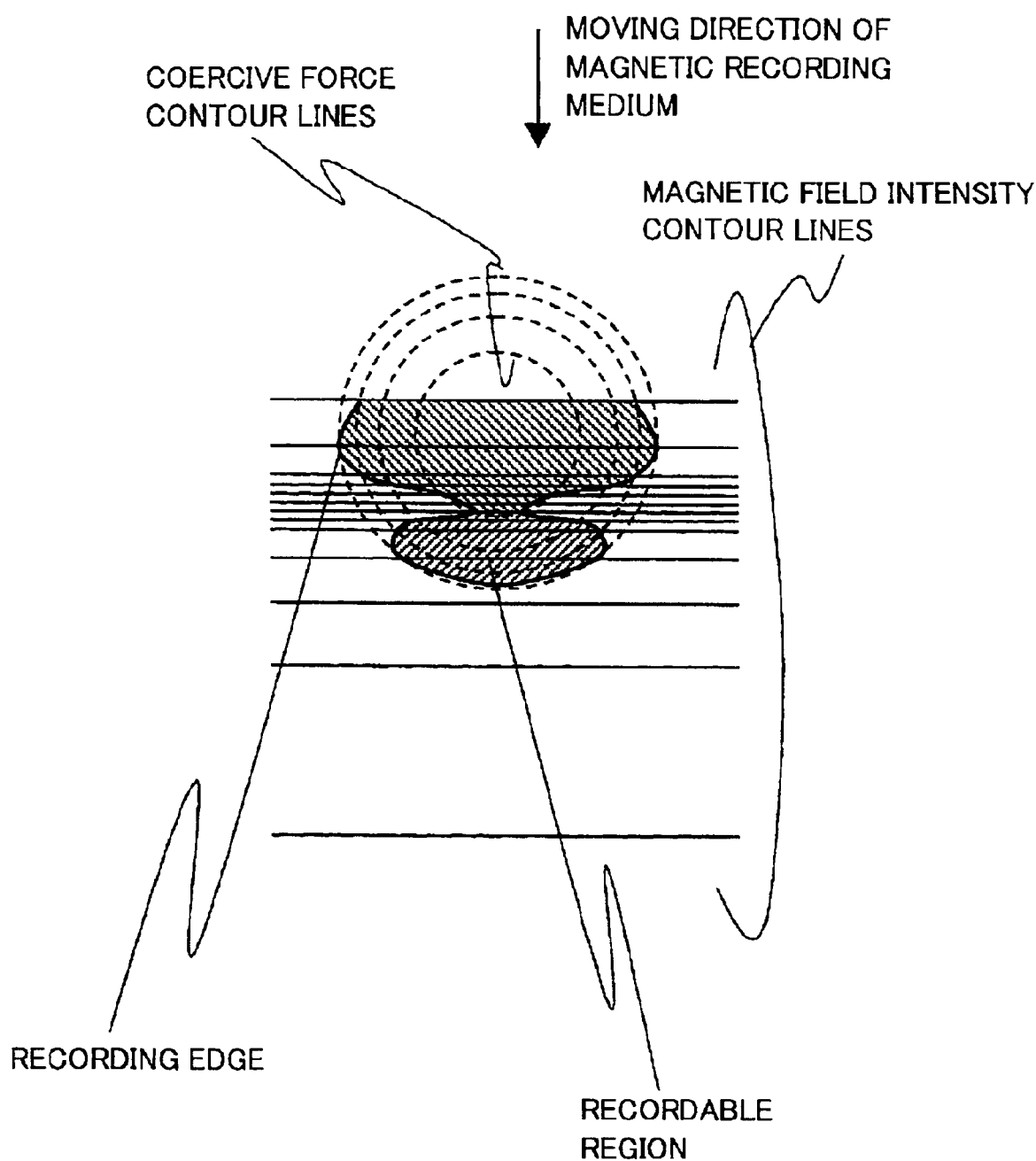
FIG. 15 is an enlarged view of the magnetic bit shown in FIG. 14.

Therefore, in the recordable region shown in FIG. 14, a recording edge has a shape that is far different from the linear shape, as shown in FIG. 15.

Figure 16:
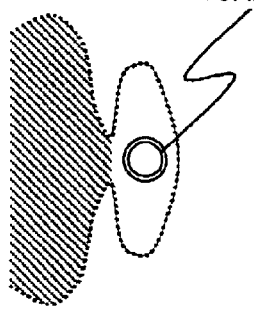
FIG. 16(a) is en explanatory view showing steps of forming the magnetic bit on the magnetic recording medium by using the magnetic bit shown in FIG. 13.
FIG. 16(b) is a timing chart of a driving current of a recording head in the steps of forming the magnetic bit shown in FIG. 16(a).
Figure 16:
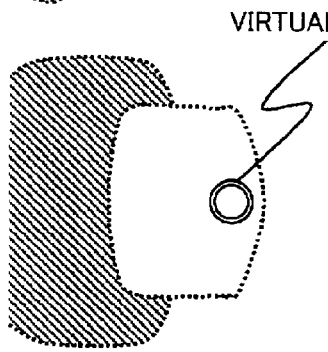
Figure 16:
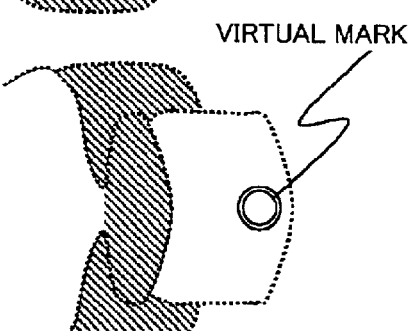
Figure 16:
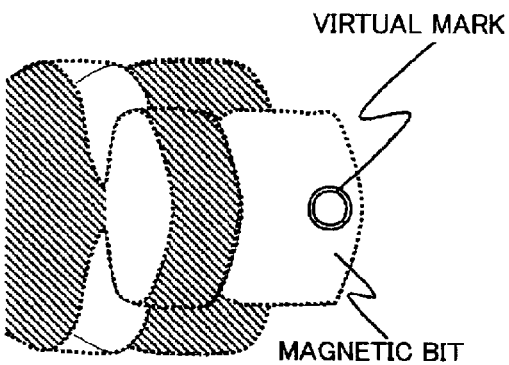
Figure 16:
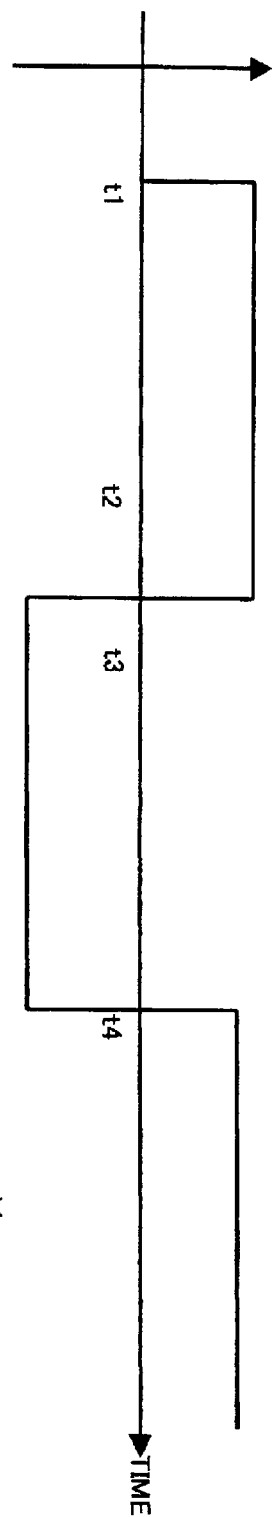

In this way, a magnetic bit is formed on the magnetic recording medium 11, via steps shown in FIGS. 16(a) and 16(b), which are similar to the steps shown in FIGS. 5(a) and 5(b) in the first embodiment. In this case, because the bit has a non-rectangular shape, and the magnetic bit in which an identical information is recorded, is magnetically inverted inside the magnetic bit itself, quality of the signal is further deteriorated.

Note that, in the present embodiment, for convenience for explanation, it is assumed that a center of heating of the optical local heater 31 is located in a leading edge of the recording gap 124 of the ring head 121 in the track direction, and the vertical magnetic field intensity is distributed as shown in FIG. 13. However, if the recording edge 182 is positioned in a region where the vertical magnetic field intensity is dramatically decreased in accordance with the in-track position, the shape of the recording edge 182 becomes approximate to the shape of the contour lines of the recording magnetic field distribution. Therefore, if the contour lines of the recording magnetic field distribution is in a rectangular shape, the magnetic bit recorded is approximately rectangular. Thus, the present invention is not limited to the present embodiment, in terms of the temperature distribution, the coercive force distribution, and the vertical magnetic field intensity distribution. Even if any of those conditions is different from the one in the present embodiment, the method of the present embodiment, that is, comparison of the vertical magnetic field intensity with the coercive force distribution, can determine the shape of the recording edge 182. Therefore, it is possible to examine various conditions to find out an advantageous condition for the reproduction of the reproduction head.

Furthermore, in the present embodiment, as the first embodiment, the coercive force contour lines are again in substantial concentric circles. Therefore, the shape of the magnetic bit is almost unchanged even in case where a side of the leading edge of the recording gap 124 of the ring head 121 makes no right angle with the moving direction of the recording medium.

Again preferable in the present embodiment is intermittent projection of a converged laser beam by using the optical local heater having a concentric circular light intensity distribution, in order to have the temperature distribution in the concentric circles even when a magnetic recording medium has a larger linear velocity.

Moreover, both the leading and the trailing edges are ended mainly by a rise in the coercive force due to a drop in the temperature. Thus, in such a region, that is, a region having a low temperature, it is preferable that the coercive force is increased at a larger rate as the temperature is lowered.

Moreover, the smaller a change in the coercive force is, the more linear is the recording edge 182. Therefore, in a region other than both the leading and the trailing edges, that is, a region having a high temperature, it is preferable that the coercive force is reduced at a smaller rate as the temperature is increased.

Furthermore, considering that the vertical magnetic field intensity turns into increase in a later half of the track direction, it is preferable that the coercive force in the region having the low temperature is increased at a large rate as the temperature goes down.

Because in the present embodiment again, as the first embodiment, because both the leading and the trailing edges of the track have a lower temperature than the middle part of the track does, it is possible to have the above conditions at once.

In a vicinity of the position where the vertical magnetic field intensity of the ring head 121 is dramatically decreased, maximum is a magnetic field intensity generated in a direction parallel to the film surface of the magnetic recording layer 13 of the magnetic recording medium 11. Therefore, it is better that the magnetic recording medium 11 has a larger magnetic anisotropy in the direction vertical to the film surface, in order to perform stable recording.

Moreover, in terms of the composition and the structure of the magnetic recording medium 11, the numerical values of the present embodiment are based on a case where a typical medium is produced by using apparatuses in a laboratory environment of the present inventors of the present application. However, the medium of the present invention is not limited to those discussed in the present embodiment, in terms of the structure, the raw materials, and the composition. For example, it is possible to realize the present invention by using an artificial lattice film having Co/Pt laminating layers, which is a vertical magnetic film showing high vertical magnetic anisotropy. In this case, the laser power, the film thickness of the magnetic recording medium and the like conditions are, of course, changed in accordance with differences in the coercive force, the Curie temperature, heat transmittance, volume specific heat, and the like.

Furthermore, of course, the present invention is not limited to the present embodiment, with respect to the coercive force of the magnetic recording medium 11, the magnetic field intensity and distribution of the magnetic field intensity generated on the magnetic recording medium 11 by the ring head 121.

Moreover, it is assumed the optical local heater 31 is disposed so as to face the ring head 121, thereby sandwiching the magnetic recording medium 11. However, it is also possible that the optical locally heading device 31 is disposed in the same side as the ring head 121 with respect to the magnetic recording medium 11, so that the converged laser beam is directly projected onto the film surface of the magnetic recording layer 13 of the magnetic recording medium 11. In this case, of course, the supporting base 12 does not need to be made of raw materials that are transparent with respect to the laser beam.

Moreover, it is assumed that the temperature distribution formed by the optical local heater 31 is in the substantially concentric circles. However, if the side of the leading edge of the recording gap 124 of the ring head 121 in the track direction makes a constant angle with the linear velocity of the magnetic recording medium 11, or if no problem is caused in terms of processing the signal when the angle is not constant, the present invention is not limited to the present embodiment.

Note that, even if the recording gap of the ring head is not in the rectangular shape, and a magnetic field-applied region is not rectangular due to this, a large reduction of the vertical magnetic field intensity in accordance with the distance from the magnetic field-applied region, the magnetic bit recorded has a shape of the leading and the trailing edges approximate to the trailing edge of the magnetic field applied region. Moreover, if the coercive force distribution can be described by the coercive force contour lines having a substantially concentric circles, the shape of the magnetic bit is almost unchanged by a change in the relationship of the angle between the moving direction of the recording medium and the ring head. Therefore, it is possible to used a reproduction head having a shape approximate to the shape of the trailing edge of the magnetic field-applied region.

In any cases, the required shape the magnetic field distribution is determined in accordance with an ability of the signal reproduction processing means, considering contribution of each part of the magnetic recording medium 11.

[Third Embodiment]

Discussed below is still another embodiment of the present embodiment.

It should be noted that, in the present embodiment, used as a recording medium is a magnetic recording medium in which an alloy thin film having an easy axis in a direction parallel to a film surface functions as a magnetic recording layer, while a ring head having a substantially rectangular shaped recording gap as a magnetic recording head. Further, sections, which have identical functions as those in the first and second embodiments, are labelled in the same fashion and their explanation is omitted here.

The magnetic recording medium used in the present embodiment is composed of an in-plane magnetic film having a composition of $Tb_{0.2}(Fe_{0.85}Co_{0.15})_{0.8}$. Thus, used is the magnetic recording medium having a structure similar to those in the first and second embodiment, and utilizing the in-plane magnetic film as the magnetic recording layer. In other words, as shown in FIG. 11, used is a magnetic recording medium 111 in which (a) a magnetic recording layer 113 made of the in-plane magnetic film having the above composition is disposed on a supporting base that is smooth and in a disc shape, (b) on a top of the magnetic recording layer 113, a protective layer 14 is disposed, and (c) on a top of the protective layer 14, a lubricant layer 15 is disposed. The supporting base 12 is transparent with respect to most of laser beams used by an optical local heater 31, which will be discussed later.

In the present embodiment, it is assumed that recording is carried out by utilizing only a parallel component of a magnetic field that is applied onto a film surface of the magnetic recording medium 111. Here, the parallel component of the magnetic field is a component of the magnetic field parallel to the film surface of the magnetic recording medium 111. Hereinafter, a coercive force of the magnetic recording medium 111, which is applied onto the magnetic field in a direction parallel to the film surface is referred to as a coercive force of the magnetic recording medium 111.

The coercive force of the magnetic recording medium 111 is temperature-dependent as shown in FIG. 17. In other words, its Curie temperature is about 250° C., and the coercive force is increased at a greater rate as the temperature is lowered from the Curie temperature. In short, the coercive force of the magnetic recording medium 111 is, in a region having a low temperature, lowered at a greater lowering rate as the temperature is increased, while the lowering rate is diminished as the temperature approaches the Curie temperature.

A detailed explanation of the magnetic recording-reproduction apparatus of the present embodiment is not repeated here, as the magnetic recording-reproduction apparatus is same as the one in the second embodiment.

In short, the magnetic recording-reproduction apparatus, as shown in FIG. 11, is provided with a ring head 121 and the optical local heater 31, which are facing each other, while sandwiching the magnetic recording medium 111 in between themselves. The magnetic recording medium 111 is moved in a direction parallel to the film surface. A recording track is formed in the direction. Thus, hereinafter, the direction is referred to as a track direction, while a direction toward which the magnetic recording medium 111 is moved is denoted as a trailing track direction.

A reproduction head 41, as the second embodiment, detects a magnetic flux leaked out of the magnetic recording medium 111 so as to detect magnetic information from a recording track formed on the magnetic recording medium 111. In addition, the reproduction head 41 has a magnetic information detection region in a substantially rectangular shape.

The ring head 121, which is used in the present embodiment, is provided with a magnetic core 122 and a coil 123 tied around the magnetic core 122. The magnetic core 122 has a recording gap 124 that has a substantially rectangular shape. On the magnetic recording layer 113 of the magnetic recording medium 111, the recording gap 124 generates a magnetic field distribution, upward or downward with respect to the film surface in accordance with polarity of a current flowing the coil 123. Note that, the ring head 121 is assumed to be disposed so that a side of a trailing edge of the recording gap 124 in the track direction makes a right angle with the track direction, at least.

In the present embodiment, used is the in-plane magnetic film with an easy axis as the magnetic recording layer 113 of the magnetic recording medium 111. Thus, the recording is carried out with respect to a direction parallel to the film surface of the magnetic recording medium 11, only. Therefore, unless otherwise specified, among a magnetic field generated on the magnetic recording medium 111, a magnetic field having a component parallel to the film surface is referred to as a parallel magnetic field, while intensity of the parallel magnetic field is denoted as parallel magnetic field intensity.

The parallel magnetic field has intensity that is distributed in the same manner as the vertical magnetic field of the single-magnetic polar head 21 as shown in FIG. 3. In addition, in this case, an origin of a position in the track direction (where the in-track position is 0 $\mu$m) is located at a center of the recording gap 124 of the ring head 121 in the track direction.

The optical local heater 31 projects a converged laser beam that makes a focus on the magnetic recording layer 113 of the magnetic recording medium 111 via the supporting base 12, so as to optically heat up a part of the magnetic recording layer 113 locally. Here, a focus image, which is formed on the magnetic recording layer 113, is almost free from aberration, while light intensity is so distributed that contour lines of the light intensity make concentric circles, that is centered at a center of the projection.

In the present embodiment, for convenience, it is assumed that a center of heating by the optical local heater 31 is located in a trailing edge in a track direction of the recording gap 124 of the ring head 121. It is also assumed that a temperature distribution is so formed on the magnetic recording medium 111 that the temperature distribution can be described by contour lines in substantially concentric circles, which is centered at the center of the heating.

It is assumed that the recording gap 124 of the ring head 121 has a gap having a width sufficiency wider than a track pitch, and generates a magnetic distribution, which is bilaterally symmetrical with respect to a direction vertical to the track direction, on the magnetic recording medium 111.

With the above conditions, the magnetic recording medium 111 can attain a positional relationship between magnetic field intensity contour lines 261 of the parallel magnetic field generated by the ring head 121, and coercive force contour lines 271 that are applied on the parallel magnetic field and are determined from the temperature distribution formed by the optical local heater 31. The positional relationship is identical with that of the first embodiment which is shown in FIG. 4.

The region, in which the ring head 121 carries out the magnetic recording in the magnetic recording medium 111, is a region where the parallel magnetic field intensity is greater than the coercive force of the magnetic recording medium, that is the region indicated by the crosshatching in FIG. 4 (a crosshatched region). Hereinafter, the region is referred to as a recordable region 281.

As the conventional method, in the present embodiment, again, the magnetic bit has leading and trailing edges whose shape is identical with a shape of a trailing edge of the recordable region 281 in the track direction. The shape of the trailing edge of the recordable region 281 in the track direction is referred to as a recording edge 282, hereinafter.

Here, as the first embodiment, the parallel magnetic field intensity is dramatically decreased as the position is distanced from the position right below the trailing edge of the recording gap 124 in the track direction. Thus, the recording edge 282 attains a more linear shape, compared with the conventional method. In other words, the shape of the recording edge 282 can be more approximate to the shape of the contour lines of the recording field distribution, when the recording edge 282, which is the edge of the recordable region 281, is located in a position where the parallel magnetic field intensity (recording magnetic field intensity) is lowered at a greatest rate.

Moreover, because the magnetic core 122 of the ring head 121 has the recording gap 124 that is substantially rectangular, the contour lines of the recording magnetic field distribution has a rectangular shape. As a result, a recorded bit has a shape that is more rectangular, compared with the conventional method. Thus, it is possible to attain a higher S/N by using the rectangular head 41 having a rectangular-shaped reproduction region, even if the high density recording is carried out in a bit direction.

In case where the parallel magnetic field intensity, which is generated on the magnetic recording medium 111 by the ring head 121, is more dramatically decreased, the recording edge 282 attains a shape more approximate to the linear shape. Thus, the shape of the magnetic bit recorded in the magnetic recording medium 111 has a shape that is more approximate to the substantially rectangular shape.

Therefore, in the present embodiment, it is preferable that the parallel magnetic field intensity is largely decreased in accordance with the position, in order to record the magnetic bit in a shape more approximate to the substantially rectangular shape.

To achieve this, as the second embodiment, it is effective that a distance between the ring head 121 and the magnetic recording medium 111 in the vertical direction with respect to the film surface, that is, magnetic spacing, is small. Moreover, it is also preferable, again, that the magnetic recording layer 113 of the magnetic recording medium 111 has a thin film thickness.

On the magnetic recording medium, the parallel magnetic field distribution of the ring head, which has a recording gap having a certain length, is equivalent to a vertical magnetic field distribution of the single-magnetic polar head that has a main magnetic pole which is equivalent to the recording gap in terms of the length. Therefore, it is possible to explain how the spacing affects by referring to the explanation in the first embodiment, where the vertical magnetic field is discussed. Just by replacing the vertical magnetic field with the parallel magnetic field in the explanation, the effect of the spacing can be understood from the explanation. This means it is preferable that the magnetic spacing and the film thickness of the magnetic recording medium are smaller or thinner than a shortest length of a magnetic bit targeted.

Furthermore, it is also effective to have a recording gap 124, which has a short length with respect to the track distance, in the ring head 121.

Note that, in the present embodiment, for convenience, it is assumed that the center of the heating of the optical local heater 31 is located in the trailing edge of the recording gap 124 of the ring head 121 in the track direction, while the parallel magnetic field intensity is distributed in the same manner as the one shown in FIG. 4. However, if the recording edge 282 is located in a region in which the parallel magnetic field intensity is dramatically lowered in accordance with the in-track position, the recording edge 282 attains a shape more approximate to the shape of the contour lines of the recording magnetic field distribution. Thus, if the contour lines of the recording magnetic field distribution have a rectangular shape, the magnetic bit is recorded in a rectangular shape. Therefore, the present invention is not limited to the present embodiment, in terms of the temperature distribution, the coercive force distribution, and the parallel magnetic field intensity distribution. Even if any of those conditions is different from the ones in the present embodiment, the method of the present embodiment, that is, comparison of the parallel magnetic field intensity with the coercive force in terms of their distribution can determine the shape of the recording edge 282. Thus, it is possible to examine a condition to obtain a shape of the magnetic bit that is suitable for reproduction by the reproduction head.

Moreover, in the present embodiment, just like the second embodiment, the coercive force contour lines make concentric circles. Therefore, even if the moving direction of the recording medium does not cross at a right angle the side of the trailing edge of the recording gap 124 of the ring head 121 in the track direction, the shape of the magnetic bit is almost unchanged.

In order to attain concentric circular temperature distribution while the linear velocity of the medium is much larger, it is preferable that an optical local heater, which has a concentric circular light intensity distribution, is used to perform intermittent projection of a converged laser beam, as the first and second embodiments.

Furthermore, in the present embodiment, again, as the first and second embodiments, the leading and trailing edges in the track direction are ended mainly by an increase in the coercive force due to a temperature drop. Therefore, it is preferable that the coercive force is largely increased as the temperature is lowered in this region, that is, in a region having a low temperature.

Moreover, in general, the recording edge 282 attains a more linear shape when a change in the coercive force is smaller. Therefore, in a region other than the leading and trailing edges in the track direction, that is, in a region having a high temperature, it is preferred that the coercive force is lowered at a smaller rate as the temperature is increased, just like the cases in the first and second embodiments.

In the present embodiment, again, as the first and second embodiments, in a vicinity of the leading and trailing edges in the track direction, a temperature is lowest, in general. Therefore, it is possible to attain the two conditions discussed above at once.

In a vicinity of a position where the parallel magnetic field intensity of the ring head 121 is largely decreased, maximum is the magnetic field intensity generated in a vertical direction to the film surface of the magnetic recording layer 113 of the magnetic recording medium 111. Thus, it is better for the magnetic recording medium 111 to have larger magnetic anisotropy in the parallel direction to the film surface of the magnetic recording layer 113, in order to attain steady recording.

Furthermore, the numerical values of the present embodiment are based on a case where a typical medium is produced by using apparatuses in a laboratory environment of the present inventors of the present application. However, the medium of the present invention is not limited to those discussed in the present embodiment, in terms of the structure, the raw materials, and the composition.

For example, for the magnetic recording medium, raw materials of the magnetic recording layer 113 of the magnetic recording medium 111 is selected while considering that the light-assisting recording is easily performed with the raw materials because of the low Curie temperature of the raw materials. However, it is possible to realize the present invention by using an alloy thin film that is composed of cobalt, chromium, and platinum, while considering importance of the magnetic anisotropy in the parallel direction to the film surface of the magnetic recording layer 113. In this case, laser power, the film thickness of the magnetic recording medium, and the like, are of course changed in accordance with the coercive force, the Curie temperature, heat transmittance, volume specific heat, and the like.

Moreover, of course, the present invention is not limited to the present embodiment in terms of the coercive force of the magnetic recording layer 113 of the magnetic recording medium 111, and the magnetic field intensity and the magnetic field intensity distribution generated on the magnetic recording medium 111 of the ring head 121, and the like.

Furthermore, here it is assumed that the optical local heater 31 is so disposed as to face the ring head 121, thereby sandwiching the magnetic recording medium 111. However, it is also possible to locate the optical local heater 31 and the ring head 121 on the same side with respect to the magnetic recording medium 11, so that the converged laser beam is directly projected onto the film surface of the magnetic recording film 13 of the magnetic recording medium 11. In this case, of course, it is not necessary to use the raw material, that is transparent to the laser beam, for the supporting base 12 that constitutes the magnetic recording medium 111.

Furthermore, it is assumed here that the optical local heater 31 forms the temperature distribution in a shape of substantially concentric circles. But, if a constant angle is made between the side of the trailing edge of the recording gap 124 of the ring head 121 in the track direction, and the linear velocity of the magnetic recording medium 111, or in case no problem is caused even if the angle is not constant, the present invention is not limited to the present embodiment.

It should be noted that, even if the recording gap of the ring head is not rectangular, thereby giving the magnetic field applied region a non-rectangular shape, it is possible to record the magnetic bit whose leading and trailing edges in the track direction have a shape approximate to the shape of the trailing edge of the magnetic field applied region, when the parallel magnetic field intensity is largely dropped in accordance with the distance from the magnetic field applied region. Moreover, if the coercive force distribution can be described by the coercive force contour lines having the substantially concentric circular shape, the shape of the magnetic bit is almost unchanged, even when the moving direction of the recording medium and the ring head make a different angle. Therefore, it is possible to use a reproduction head having a shape approximate to the shape of the magnetic field applied region.

In any one of those cases, the required shape of the magnetic field distribution is determined in accordance with an ability of the reproduction signal processing, while considering how each part of the magnetic recording medium 111 contributes to a reproduction signal.

The magnetic signal recording method recited in the present invention uses (a) magnetic recording medium whose coercive force is varied with a temperature, (b) local heating means for heating up the magnetic recording medium locally, and (c) a magnetic recording head that generates a magnetic field distribution whose magnetic field intensity, which related to information recording, is largely decreased in accordance with an in-track position, so as to use the magnetic field from the magnetic recording head so as to record arbitrary information in a region on the magnetic recording medium where the coercive force has been changed by the local heating means.

Moreover, in the magnetic signal recording method recited in the present invention, the magnetic field intensity, which relates to the information recording, is largely lowered at least in the trailing edge in the track direction in accordance with the trailing track position, in the region where substantial equality is attained between (a) a coercive force in the region where the coercive force on the magnetic recording medium has been varied by the local heating means, and (b) magnetic field intensity.

In this way, it is possible to record a magnetic bit having edges in the track direction that has a shape approximate to the trailing edge of the magnetic recording head in the track direction.

Moreover, in the magnetic signal recording method recited in the present invention, the magnetic recording medium and the magnetic recording head, which records a magnetic bit, have a space between themselves in a direction vertical to a film surface of the magnetic recording medium, the space being smaller than a length of the magnetic bit with respect to the track.

This makes it possible to generate on the magnetic recording medium the magnetic field distribution whose magnetic field intensity, which is related to the information recording, is largely decreased in accordance with the in-track position in the trailing track direction.

Furthermore, in the magnetic signal recording method recited in the present invention, the magnetic recording medium has a film thickness thinner than the length of the magnetic bit with respect to the track, where the magnetic bit is recorded by the magnetic recording head.

This makes it possible to generate the magnetic field distribution whose magnetic field intensity, which is related to the information recording, is largely decreased in accordance of the in-track position in the trailing track direction, regardless of the position in a perpendicular direction of the magnetic recording medium.

Moreover, in the magnetic signal recording method recited in the present invention, the magnetic recording head applies and distributes a recording magnetic field in a rectangular shape on the magnetic recording medium.

This makes it possible to record a magnetic bit whose shape is suitable for reproduction performed by a reproduction head, which is commonly used, having a magnetic information detection region in a rectangular shape.

Furthermore, in the magnetic signal recording method recited in the present invention, the recording is performed in a region where a temperature distribution of a magnetic recording medium, which has been heated by local heating means, makes concentric circles.

In this way, recording of the magnetic bit can be performed regardless of the angular relationship between the moving direction of the magnetic recording medium and the magnetic recording head.

Moreover, the magnetic signal recording method recited in the present invention performs the local heating in an intermittent manner, as the local heating method of the local heating means.

This allows the substantially concentric circular temperature distribution to be formed on the magnetic recording medium, even if the medium has a large linear velocity.

Furthermore, the magnetic signal recording method recited in the present invention uses, as the magnetic recording medium, a medium whose coercive force is largely decreased in the region having a low temperature as the temperature is increased, at a temperature within such a range that the coercive force and the magnetic field intensity are equal to each other.

Because of this, it is possible to end the leading and trailing edges of the magnetic bit in the track direction in accordance with the temperature distribution, while diminishing a region where the shape of the edges of the magnetic bit in the track direction is shifted from the shape of the magnetic field distribution.

Moreover, the magnetic signal recording method recited in the present invention uses, as the magnetic recording medium, a medium whose coercive force is small decreased in the region having a high temperature as the temperature is increased, at a temperature within such a range that the coercive force and the magnetic field intensity are equal to each other.

This makes it possible to record the magnetic bit whose edge in the track direction in a middle part of in the track direction have a shape approximate to the shape of the magnetic field distribution.

Moreover, in the magnetic signal recording method recited in the present invention, the magnetic recording medium is provided with a layer that includes an alloy made of at least one kind of rare earth metals and at least one sort of transition metals.

This realizes a magnetic recording medium the realizes the temperature dependence of the coercive force.

In addition, examples of the rare earth metals are, namely: neodymium, terbium, gadolinium, and dysprosium and the like, while cobalt, iron, manganese and nickel are examples of the transition metals.

Especially, when the magnetic recording medium is an alloy that includes terbium, iron and cobalt in a ratio of $Tb_x(Fe_yCo_{1-y})_{1-x}$, where $0.05 < x < 0.4$, and $0 \leq y \leq 1$, the magnetic recording medium is effective because the coercive force dependence can be controlled by the x value in the region having the low temperature, while being controlled by the y value in the region having the high temperature.

Furthermore, the magnetic signal recording method recited in the present invention uses a magnetic recording medium that has an easy axis vertical to the film surface of the magnetic recording medium, and a magnetic head that generates, on the film surface of the magnetic recording medium, the magnetic field distribution whose magnetic field component vertical to the film surface is largely decreased in accordance with the in-track position.

This realizes such a condition that the magnetic field intensity, which relates to the recording, is largely decreased in accordance with the position.

Moreover, the magnetic signal recording method recited in the present invention uses a single-magnetic polar head as the magnetic head that generates, on the film surface of the magnetic recording medium, the magnetic field distribution whose magnetic field component vertical to the film surface is largely decreased in accordance with the in-track position. The single-magnetic polar head has a main magnetic pole having a width wider than the track pitch.

As a practical device, the single-magnetic polar head is preferably adapted. Of course, it is preferable that the main magnetic pole width is wider than the track pitch, in order to attain a constant magnetic field distribution in a direction of track width.

Moreover, in the magnetic signal recording method recited in the present invention, the magnetic recording medium, which has the easy axis vertical the film surface of the magnetic recording medium, includes a soft magnetic layer.

The magnetic flux is converged when the soft magnetic layer is disposed in the position which face to the single-magnetic polar head, while sandwiching the magnetic recording medium. Thus, it is possible to form, on the magnetic recording medium, the magnetic field distribution whose vertical magnetic field intensity is largely decreased in accordance with the in-track position.

Furthermore, in the magnetic signal recording method recited in the present invention, in the region on the recording medium where the coercive force has been varied by the local heating means, at least a part of a region, where the coercive force and the magnetic field intensity of the single-magnetic polar head are equal to each other in terms of components vertical to the film surface of the recording medium, is positioned in the trailing edge of the main magnetic pole of the single-magnetic polar head in the track direction.

The vertical magnetic field intensity is decreased at a largest rate in the trailing edge of the main magnetic pole of the single-magnetic polar head in the track direction, according to the trailing track position. For this reason, it is most preferable that at least a part of the region, where the coercive force and the magnetic field intensity of the single-magnetic polar head are equal to each other in terms of the vertical component to the film surface of the recording medium, is the trailing edge of the main magnetic pole of the single-magnetic polar head in the track direction.

Moreover, the magnetic signal recording method recited in the present invention uses the ring head as the magnetic head that generates the magnetic field distribution whose vertical component of the magnetic field intensity, which is vertical to the film surface, is largely decreased in terms of the in-track direction. The ring head has a ring head recording gap whose width is wider than the track pitch.

It is possible to use the ring head as the magnetic head that generates the magnetic field distribution whose vertical component of the magnetic field intensity, which is vertical to the film surface, is largely decreased in accordance with the in-track position.

Moreover, the magnetic signal recording method recited in the present invention uses a ring head whose recording gap length is small.

This makes it possible to generate, on the magnetic recording medium, the magnetic field distribution whose vertical component of the magnetic field intensity, which is vertical to the magnetic recording medium, is largely decreased in accordance with the in-track position.

Furthermore, in the magnetic signal recording method recited in the present invention, the magnetic recording medium, which has the axis of easy magnetization vertical to the film surface of the magnetic recording medium, includes a soft magnetic layer.

This converges the magnetic flux so as to generate, on the magnetic recording medium, the magnetic field distribution whose vertical component of the magnetic field intensity, which is vertical to the magnetic recording medium, is largely decreased in accordance with the in-track position.

Moreover, in the magnetic signal recording method recited in the present invention, in the region on the recording medium where the coercive force has been varied by the local heating means, at least a part of a region, where the coercive force and the magnetic field intensity of the single-magnetic polar head are equal to each other in terms of components vertical to the film surface of the recording medium, is located in a vicinity of the position right below the leading edge of the ring head recording gap in the track direction.

The vertical magnetic field intensity of the ring head is decreased at the largest rate in the vicinity of the position right below the leading edge of the ring head recording gap in the track direction. Therefore, it is most desirable that at least a part of the region, where the coercive force and the magnetic field intensity of the single-magnetic polar head are equal to each other in terms of components vertical to the film surface of the recording medium, is positioned in the position.

Moreover, in the magnetic signal recording method recited in the present invention, the magnetic recording medium is a magnetic recording medium having high magnetic anisotropy in a vertical direction.

Regarding both the ring head and the single-magnetic polar head, in the vicinity of the position where the magnetic field intensity vertical to the film surface of the medium is largely decreased, the magnetic field intensity parallel to the film surface has its maximum value. Therefore, it is preferable to use, as the magnetic recording medium, a medium that is less sensitive to the parallel magnetic field intensity, in other words, a medium having high vertical magnetic anisotropy.

The magnetic recording medium is composed of a layer including an alloy made of at least one kind of the rare earth metals and at least one kind of the transition metals.

The alloy of the rare earth metal and transition metal shows high anisotropy and is suitable for the above condition.

Among such magnetic recording media, such magnetic recording medium, which includes, as the rare earth metals, neodymium, terbium, gadolinium, and dysprosium and the like, has high magnetic anisotropy.

Moreover, it is also possible to attain high magnetic anisotropy when the magnetic recording medium includes at least one of those transition metals, namely, cobalt, iron, manganese and nickel.

Moreover, a magnetic recording medium, which includes an alloy containing terbium, iron and cobalt, especially, such a magnetic recording medium whose alloy contains those elements with a ratio of $Tb_x(Fe_yCo_{1-y})_{1-x}$, where $0.05<x<0.4$, and $0 \leq y \leq 1$, shows high vertical magnetic anisotropy.

Moreover, it is also possible to realize the magnetic recording medium having high vertical magnetic anisotropy by using an alloy containing cobalt and platinum. Especially, among such magnetic recording media, an artificial lattice film, which contains at least cobalt and platinum, shows high vertical magnetic anisotropy.

Moreover, the magnetic signal recording method recited in the present invention can be realized by using the magnetic recording medium having the easy axis parallel to the film surface of the recording medium, and the magnetic head that generates, on the magnetic recording medium, the magnetic field whose component, which is parallel to the film surface, of the magnetic field intensity, is largely decreased in accordance with the in-track direction.

Furthermore, it is possible to use, the ring head as the magnetic head that generates, on the magnetic recording medium, the magnetic field whose component, which is parallel to the film surface, of the magnetic field intensity, is largely decreased in accordance with the in-track direction, where the ring head has a recording gap width wider than the track pitch.

Moreover, in the region on the recording medium, where the coercive force has been varied by the local heating means, it is possible to perform recording in a region where the magnetic field intensity, which relates to the recording, is lowered at the largest rate, when at least a part of the region, where the coercive force and the magnetic field intensity of the single-magnetic polar head are equal to each other in terms of components in-plane direction of the film surface of the recording medium, is located in the position right below the trailing edge of the ring head recording gap in the track direction.

Moreover, in the vicinity of the above region, the component, which is vertical to the film surface of the magnetic recording medium, of the magnetic field intensity is maximum. Therefore, it is preferable that the magnetic recording medium having high in-plane magnetic anisotropy is used as the magnetic recording medium.

Such a magnetic recording medium can be realized by using an alloy containing at least one of cobalt and platinum.

Furthermore, the magnetic signal recording reproduction apparatus recited in the present invention is provided with magnetic signal recording means, in which at least one of the above magnetic signal recording method is applied, and magnetic signal reproduction means.

Furthermore, a magnetic signal recording method of the present invention, comprising the step of recording arbitrary information in a region on the magnetic recording medium where the coercive force has been varied with local heating, in accordance with a magnetic field from a magnetic recording head, wherein an edge of a recordable region on the magnetic recording medium is located in a position in which substantial equality is attained between (a) a coercive force in the region where the coercive force on the magnetic recording medium has been varied, and (b) magnetic field intensity in an in-track position in which a magnetic field distribution generated by the magnetic recording head is lowered at a greatest rate.

With the above arrangement, the shape of the edge of the recordable region becomes approximate to the shape of the contour lines of the recording magnetic field distribution, by locating the edge of the recordable region in the position where substantial equality is attained between (a) a coercive force in the region where the coercive force on the magnetic recording medium has been varied, and (b) magnetic field intensity in an in-track position in which a magnetic field distribution generated by the magnetic recording head is lowered at a greatest rate.

It may be so arranged that the magnetic recording medium and the magnetic recording head, which records a magnetic bit, have a space between themselves in a direction vertical to a film surface of the magnetic recording medium, the space being smaller than a length of the magnetic bit with respect to the track.

In this case, it is possible to generate on the recording medium a magnetic field distribution whose magnetic field intensity, which relates to the recording the information, is largely lowered in accordance with the in-track position in the trailing track direction. On the magnetic recording medium, this further enlarges the lowering rate of the magnetic field intensity in the in-track position in the trailing track direction. In other words, the shape of the edge of the recordable region can be more approximate to the shape of the contour lines of the recording magnetic field distribution.

It may be so arranged that the magnetic recording medium has a film thickness thinner than the length of the magnetic bit with respect to the track, where the magnetic bit is recorded by the magnetic recording head.

In this case, it is possible to generate on the magnetic recording medium a magnetic field distribution whose magnetic field intensity, which relates to the recording the information, is largely lowered in accordance with the in-track position in the trailing track direction, regardless of the position with respect to the perpendicular direction of the magnetic recording medium.

It may be so arranged that the magnetic recording head applies and distributes a recording magnetic field in a rectangular shape on the magnetic recording medium.

In this way, the use of the magnetic recording head whose recording magnetic field distribution has a rectangular shape can give the recording magnetic field distribution contour lines having a rectangular shape. Therefore, the edge of the recordable region is in the rectangular shape, thereby recording the magnetic bit having the rectangular shape.

Because of this, when a reproduction head, which has a rectangular reproduction region, reproduces the magnetic field, which is leaked out of the substantially rectangular magnetic bit formed on the magnetic recording medium, the S/N of a reproduction signal of the magnetic recording medium, which has been subjected to high density recording in which the magnetic bit is recorded in a high density.

In addition, it may be so arranged that the edge of the recordable region is positioned in a region where a temperature distribution of a heated magnetic recording medium makes concentric circles.

In this case, the magnetic bit is recorded regard less of the angular relationship between the moving direction of the magnetic recording medium and the magnetic recording head. In short, with provision of a system for using a disc-shape magnetic recording medium and for rotating the magnetic recording medium, and a system for moving a recording-reproduction head in substantially radial direction of the disc-shaped magnetic recording medium, that is, in case the magnetic field distribution and the temperature distribution make a inconstant angle in accordance with an access position of the recording-reproduction head, it is possible to record the magnetic recording medium while maintaining the constant shape of the magnetic bit.

It may be so arranged that the magnetic recording medium is a magnetic film whose coercive force is lowered at a greater rate as a temperature rises in a region having a low temperature within a temperature range than a region having a high temperature within the temperature range, where the coercive force and the magnetic field intensity are equal within the temperature range.

In this case, it is possible to realize that the both leading and trailing edges of the magnetic bit in the track direction are ended in accordance with the temperature distribution, while diminishing the region in which the shape of the leading and trailing edges of the magnetic bit in the track direction is shifted from the shape of the magnetic field distribution. Moreover, it is possible to record the magnetic bit whose edges in the track direction are approximate to the shape of the magnetic field distribution in the middle part in the track direction.

Another magnetic signal recording method of the present invention, comprising the step of recording arbitrary information in a region on a magnetic recording medium where a coercive force has been varied with local heating, in which a single-magnetic polar head is used as a magnetic recording head, the magnetic recording medium having an axis of easy magnetization vertical to a film surface of the magnetic recording medium, and the single-magnetic polar head generating a magnetic field having a component vertical to the film surface, while having a main magnetic pole wider than a track pitch, wherein an edge of a recordable region on the magnetic recording medium is located in a position where substantial equality is attained between (a) a coercive force in the region where the coercive force on the magnetic recording medium has been varied, and (b) a component of magnetic field intensity of the single-magnetic polar head in a position in which the component is lowered at a greatest rate in a trailing edge of the main magnetic pole in the track direction, the component being vertical to the film surface.

With the above arrangement, the shape of the edge of the recordable region becomes approximate to the shape of the contour lines of the recording magnetic field distribution, by locating the edge of the recordable region in the position where substantial equality is attained between (a) a coercive force in the region where the coercive force on the magnetic recording medium has been varied, and (b) a component, which is vertical to the film surface, of magnetic field intensity of the single-magnetic polar head in a position in which the component is lowered at a greatest rate in a trailing edge of the main magnetic pole in the track direction.

Moreover, in the trailing edge of the main magnetic pole of the single-magnetic polar head in the track direction, the vertical magnetic field intensity is lowered at a maximum rate in accordance with the in-track direction in the trailing part. Therefore, it is most preferable that at least a part of the region, in which the coercive force and the magnetic field intensity is equal to each other in terms of the vertical components to the film surface of the recording medium, is located in the trailing edge.

For example, the used of the magnetic recording head whose recording magnetic field is distributed in the rectangular shape on the magnetic recording medium can give the recording magnetic field distribution rectangular contour lines, thereby making the shape of the recordable region rectangular, so as to record magnetic bit in the rectangular shape.

Because of this, in case the reproduction head, whose reproduction region is in the rectangular shape, is used to reproduce the magnetic field that is leaked out of the magnetic bit having the substantially rectangular shape formed on the magnetic recording medium, it is possible to improve the S/N of the reproduction signal of the magnetic recording medium that has been subjected to the high density recording in which the magnetic bit is recording with the high density.

Still another magnetic signal recording method of the present invention, comprising the step of recording arbitrary information in a region on a magnetic recording medium where a coercive force has been varied with local heating, in which a ring head is used as a magnetic recording head, the magnetic recording medium having an axis of easy magnetization vertical to a film surface of the magnetic recording medium, and the ring head generating a magnetic field having a component vertical to the film surface, while having a ring head recording gap width that is wider than a track pitch, wherein an edge of a recordable region on the magnetic recording medium is located in a position in which substantial equality is attained between (a) a coercive force in the region where the coercive force on the magnetic recording medium has been varied, and (b) a component of magnetic field intensity of the ring head in a position in which the component is lowered at a greatest rate in a vicinity of a position right below a leading edge of the ring head recording gap in the track direction, the component being vertical to the film surface.

With the above arrangement, the shape of the edge of the recordable region becomes approximate to the shape of the contour lines of the recording magnetic field distribution, by locating the edge of the recordable region in the position where substantial equality is attained between (a) a coercive force in the region where the coercive force on the magnetic recording medium has been varied, and (b) a component, which is vertical to the film surface, of magnetic field intensity of the ring head in a position in which the component is lowered at a greatest rate in a vicinity of a position right below a leading edge of the ring head recording gap in the track direction.

Moreover, because the vertical magnetic field intensity of the ring head is lowered at the maximum rate in the vicinity of the position right below the leading edge of the ring head recording gap in the track direction, it is preferable that at least a part of the region, in which the coercive force and the magnetic field intensity is equal to each other in terms of the vertical components to the film surface of the recording medium, is located in the trailing edge.

It may be so arranged that the magnetic recording medium, which has the axis of easy magnetization vertical to the film surface of the magnetic recording medium, includes a soft magnetic layer.

In this case, the soft magnetic layer can be so disposed to face the single-magnetic polar head or the ring head, while sandwiching the magnetic recording medium. As a result, the magnetic flux is converged. Therefore, it is possible to form on the magnetic recording medium the magnetic field distribution whose vertical magnetic field intensity is largely decreased in accordance with the in-track position.

Moreover, in the magnetic signal recording method recited in the present invention, wherein the magnetic recording medium is a magnetic recording medium having high magnetic anisotropy in a vertical direction.

In general, Regarding both the ring head and the single-magnetic polar head, in the vicinity of the position where the magnetic field intensity vertical to the film surface of the medium is largely decreased, the magnetic field intensity parallel to the film surface has its maximum value. Therefore, it is preferable to use, as the magnetic recording medium, a medium having high vertical magnetic anisotropy, as discussed above.

It may be so arranged that the magnetic recording medium and the magnetic recording head, which records a magnetic bit, have a space between themselves in a direction vertical to a film surface of the magnetic recording medium, the space being smaller than a length of the magnetic bit with respect to the track.

In this case, it is possible to generate on the magnetic recording medium the magnetic field distribution whose magnetic field intensity, which is related to the information recording, is largely decreased in accordance with the in-track position in the trailing track direction. On the magnetic recording medium, this makes it possible to further enlarge the lowering rate of the magnetic field intensity in the in-track position in the track direction. In short, the shape of the edge of the recordable region can be more approximate to the shape of the contour lines of the recording magnetic field distribution.

It may be so arranged that the magnetic recording medium has a film thickness thinner than the length of the magnetic bit with respect to the track, where the magnetic bit is recorded by the magnetic recording head.

In this case, it is possible to generate the magnetic field distribution whose magnetic field intensity, which is related to the information recording, is largely decreased in accordance of the in-track position in the trailing track direction, regardless of the position in a perpendicular direction of the magnetic recording medium.

It may be so arranged that the magnetic recording head applies and distributes a recording magnetic field in a rectangular shape on the magnetic recording medium.

As above, the use of the magnetic recording head, whose recording magnetic field is distributed in the rectangular shape, can give the contour lines in the rectangular shape to the recording magnetic field distribution. Therefore, the shape of the recordable region is in the rectangular shape, thereby recording the magnetic bit in the rectangular shape.

Because of this, in case where the reproduction head whose reproduction region is in the rectangular shape is used to reproduce the magnetic field leaked out of the magnetic bit formed in the substantially rectangular shape on the magnetic recording medium, it is possible to improve the S/N of the reproduction signal of the magnetic recording medium which has been subjected to the high density recording in which the magnetic bit is recorded in the high density.

Moreover, it may be arranged that the edge of the recordable region is positioned in a region where a temperature distribution of a heated magnetic recording medium makes concentric circles.

In this case, the magnetic bit is recorded regard less of the angular relationship between the moving direction of the magnetic recording medium and the magnetic recording head. In short, with provision of a system for using a disc-shape magnetic recording medium and for rotating the magnetic recording medium, and a system for moving a recording-reproduction head in substantially radial direction of the disc-shaped magnetic recording medium, that is, in case the magnetic field distribution and the temperature distribution make a inconstant angle in accordance with an access position of the recording-reproduction head, it is possible to record the magnetic recording medium while maintaining the constant shape of the magnetic bit.

It may be so arranged that the magnetic recording medium is a magnetic film whose coercive force is lowered at a greater rate as a temperature rises in a region having a low temperature within a temperature range than a region having a high temperature within the temperature range, where the coercive force and the magnetic field intensity are equal within the temperature range.

In this case, it is possible to realize that the both leading and trailing edges of the magnetic bit in the track direction are ended in accordance with the temperature distribution, while diminishing the region in which the shape of the leading and trailing edges of the magnetic bit in the track direction is shifted from the shape of the magnetic field distribution. Moreover, it is possible to record the magnetic bit whose edges in the track direction are approximate to the shape of the magnetic field distribution in the middle part in the track direction.

Yet another magnetic signal recording method of the present invention, comprising the step of recording arbitrary information in a region on the magnetic recording medium where the coercive force has been varied with local heating, in which a ring head is used as a magnetic recording head, the magnetic recording medium having an axis of easy magnetization parallel to a film surface of the magnetic recording medium, and the ring head generating a magnetic field having a component parallel to the film surface, while having a ring head recording gap width that is wider than a track pitch, wherein an edge of a recordable region on the magnetic recording medium is located in a position in which substantial equality is attained between (a) a coercive force in the region where the coercive force on the magnetic recording medium has been varied, and (b) a component of magnetic field intensity of the ring head in a position in which the component is lowered at a greatest rate in a trailing edge of the ring head recording gap in the track direction, the component being parallel to the film surface.

With the above arrangement, the shape of the edge of the recordable region becomes approximate to the shape of the contour lines of the recording magnetic field distribution, by locating the edge of the recordable region in the position where substantial equality is attained between (a) a coercive force in the region where the coercive force on the magnetic recording medium has been varied, and (b) a component, which is parallel to the film surface, of magnetic field intensity of the ring head in a position in which the component is lowered at a greatest rate in a trailing edge of the ring head recording gap in the track direction.

In this way, the magnetic recording head, whose recording magnetic field is distributed in a rectangular shape on the magnetic recording medium. As a result the contour lines of the recording magnetic field are given the rectangular shape, thereby the shape of the edge of the recordable region is rectangular. This allows the magnetic bit to be recorded in the rectangular shape.

Because of this, in case the reproduction head, whose reproduction region is in the rectangular shape, is used to reproduce the magnetic field that is leaked out of the magnetic bit having the substantially rectangular shape formed on the magnetic recording medium, it is possible to improve the S/N of the reproduction signal of the magnetic recording medium that has been subjected to the high density recording in which the magnetic bit is recorded with the high density.

Moreover, as discussed above, in the region on the magnetic recording medium in which the coercive force is varied with the temperature rise, at least a part of the region, where the coercive force and the magnetic field intensity of the ring head are equal to each other in terms of the in-plane component of the magnetic recording medium, is located in the position right below the trailing edge of the ring head recording gap in the track direction. This makes it possible to perform recording in the region where the magnetic field intensity, which is related to the recording, is lowered at the largest rate.

In the above region, because the component, which is vertical to the film surface of the magnetic recording medium, of the magnetic field intensity is maximum, it is preferable to use, as the magnetic recording medium, a magnetic recording medium having high in-plane magnetic anisotropy. Specifically, used is the magnetic recording medium including the alloy containing at least one of cobalt and platinum.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magnetic signal recording method in which information is recorded to a magnetic recording medium and read magnetically from the recording medium, said magnetic signal recording method comprising the step of:

recording arbitrary information in a region on the magnetic recording medium where a coercive force has been varied with local heating, in accordance with a magnetic field from a magnetic recording head, wherein a positional relationship between a magnetic field distribution and the distribution of a coercive force of the magnetic recording medium is established in such a manner as to generate an edge of a recordable region at a position where a recording magnetic field intensity is lowered at a maximum.

2. The magnetic signal recording method as set forth in claim 1, wherein said magnetic recording medium and said magnetic recording head, which records a magnetic bit, have a space between themselves in a direction vertical to a film surface of said magnetic recording medium, said space being smaller than a length of the magnetic bit with respect to the track.

3. The magnetic signal recording method as set forth in claim 1, wherein said magnetic recording medium has a film thickness thinner than the length of the magnetic bit with respect to the track, where the magnetic bit is recorded by said magnetic recording head.

4. The magnetic signal recording method as set forth in claim 1, wherein said magnetic recording head applies and distributes a recording magnetic field in a rectangular shape on said magnetic recording medium.

5. The magnetic signal recording method as set forth in claim 1, wherein the edge of the recordable region is positioned in a region where a temperature distribution of a heated magnetic recording medium makes concentric circles.

6. The magnetic signal recording method as set forth in claim 1, wherein said magnetic recording medium is a magnetic film whose coercive force is lowered at a greater rate as a temperature rises in a region having a low temperature within a temperature range than a region having a high temperature within the temperature range, where the coercive force and the magnetic field intensity are equal within the temperature range.

7. A magnetic signal recording method in which information is recorded to a magnetic recording medium and read magnetically from the recording medium, said magnetic signal recording method comprising the step of:

recording arbitrary information in a region on the magnetic recording medium where a coercive force has been varied with local heating, in which a single-magnetic polar head is used as a magnetic recording head, said magnetic recording medium having an axis of easy magnetization vertical to a film surface of said magnetic recording medium, and said single-magnetic polar head generating a magnetic field that has a component vertical to the film surface, while having a main magnetic pole wider than a track pitch, wherein during said recording a positional relationship between a magnetic field distribution and the distribution of a coercive force of the magnetic recording medium is established in such a manner as to generate an edge of a recordable region at a position where a recording magnetic field intensity is lowered at a maximum in a trailing edge of the main magnetic pole in the track direction, said component being vertical to the film surface.

8. The magnetic signal recording method as set forth in claim 7, wherein said magnetic recording medium, which has the axis of easy magnetization vertical to the film surface of said magnetic recording medium, includes a soft magnetic layer.

9. The magnetic signal recording method as set forth in claim 7, wherein said magnetic recording medium is a magnetic recording medium having high magnetic anisotropy in a vertical direction.

10. The magnetic signal recording method as set forth in claim 7, wherein said magnetic recording medium and said magnetic recording head, which records a magnetic bit, have a space between themselves in a direction vertical to a film surface of said magnetic recording medium, said space being smaller than a length of the magnetic bit with respect to the track.

11. The magnetic signal recording method as set forth in claim 7, wherein said magnetic recording medium has a film thickness thinner than the length of the magnetic bit with respect to the track, where the magnetic bit is recorded by said magnetic recording head.

12. The magnetic signal recording method as set forth in claim 7, wherein said magnetic recording head applies and distributes a recording magnetic field in a rectangular shape on said magnetic recording medium.

13. The magnetic signal recording method as set forth in claim 7, wherein the edge of the recordable region is positioned in a region where a temperature distribution of a heated magnetic recording medium makes concentric circles.

14. The magnetic signal recording method as set forth in claim 7, wherein said magnetic recording medium is a magnetic film whose coercive force is lowered at a greater rate as a temperature rises in a region having a low temperature within a temperature range than a region having a high temperature within the temperature range, where the coercive force and the magnetic field intensity are equal within the temperature range.

15. A magnetic signal recording method in which information is recorded to a magnetic recording medium and read magnetically from the recording medium, said magnetic signal recording method comprising the step of:

recording arbitrary information in a region on the magnetic recording medium where a coercive force has been varied with local heating in which a ring head is used as a magnetic recording head, said magnetic recording medium having an axis of easy magnetization parallel to a film surface of said magnetic recording medium, and said ring head generating a magnetic field having a component parallel to the film surface, while having a ring head recording gap width that is wider than a track pitch, wherein during said recording a positional relationship between a magnetic field distribution and the distribution of a coercive force of the magnetic recording medium is established in such a manner as to generate an edge of a recordable region at a position where a recording magnetic field intensity is lowered at a maximum in a trailing edge of the ring head recording gap in the track direction, said component being parallel to the film surface.

16. The magnetic signal recording method as set forth in claim 15, wherein said magnetic recording medium is a magnetic recording medium having high magnetic anisotropy in an in-plane direction.

17. A magnetic signal recording method in which information is recorded to a magnetic recording medium and read magnetically from the recording medium, comprising the step of:

recording arbitrary information in a region on a magnetic recording medium where a coercive force has been varied with local heating in which a ring head is used as a magnetic recording head, said magnetic recording medium having an axis of easy magnetization vertical to a film surface of said magnetic recording medium, and said ring head generating a magnetic field having a component vertical to the film surface, while having a ring head recording gap width that is wider than a track pitch, wherein during said recording a positional relationship between a magnetic field distribution and the distribution of a coercive force of the magnetic recording medium is established in such a manner as to generate an edge of a recordable region at a position where a recording magnetic field intensity is lowered at a maximum in a vicinity of a position right below a leading edge of the ring head recording gap in the track direction, said component being vertical to the film surface.

18. A magnetic recording-reproduction apparatus, comprising:

magnetic signal recording means for recording a magnetic signal in accordance with a magnetic signal recording method; and magnetic signal reproduction means for reproducing a magnetic signal recorded in a magnetic recording medium by said magnetic signal recording means, said magnetic signal recording method including the step of:

recording arbitrary information in a region on said magnetic recording medium where a coercive force has been varied with local heating, in accordance with a magnetic field from a magnetic recording head, wherein during said recording of arbitrary information a positional relationship between a magnetic field distribution of the magnetic field and the distribution of a coercive force of the magnetic recording medium is established in such a manner as to generate an edge of a recordable region at a position where a recording magnetic field intensity is lowered at a maximum.

* * * * *